United States Patent
Nakamura et al.

(10) Patent No.: US 9,659,346 B2
(45) Date of Patent: May 23, 2017

(54) IMAGE PROCESSING APPARATUS, IMAGE PROCESSING METHOD, SOLID-STATE IMAGING DEVICE, AND ELECTRONIC APPARATUS CONFIGURED TO CALCULATE A PIXEL VALUE OF A TARGET POSITION IN ACCORDANCE WITH A WEIGHTED VALUE OF EACH PIXEL ON A CANDIDATE LINE OF A PLURALITY OF CANDIDATE LINES

(71) Applicant: Sony Semiconductor Solutions Corporation, Kanagawa (JP)

(72) Inventors: Shigeki Nakamura, Kanagawa (JP); Yasunobu Hitomi, Kanagawa (JP); Tomoo Mitsunaga, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 6 days.

(21) Appl. No.: 14/549,312

(22) Filed: Nov. 20, 2014

(65) Prior Publication Data
US 2015/0146064 A1     May 28, 2015

(30) Foreign Application Priority Data

Nov. 27, 2013  (JP) .................................. 2013-244948

(51) Int. Cl.
*H04N 5/228* (2006.01)
*G06T 3/40* (2006.01)
*H04N 5/217* (2011.01)

(52) U.S. Cl.
CPC ............ *G06T 3/4007* (2013.01); *G06T 3/403* (2013.01)

(58) Field of Classification Search
CPC ...... H04N 5/357; H04N 3/1568; H04N 1/409; H04N 1/58; H04N 1/4092; G03B 2217/005; G06T 5/003
USPC .................. 348/241, 246–252, 208.99, 208.4
See application file for complete search history.

(56) References Cited

U.S. PATENT DOCUMENTS 7,567,724 B2 *  7/2009  Gomi ................... G06K 9/4609
                                                  348/610
2005/0231616 A1 * 10/2005  Iwai ....................... H04N 5/217
                                                  348/241

(Continued)

FOREIGN PATENT DOCUMENTS

JP   2010-055410 A   10/2000
JP   4343255 B1      7/2009

(Continued)

*Primary Examiner* — Kelly L Jerabek
(74) *Attorney, Agent, or Firm* — Sheridan Ross P.C.

(57) ABSTRACT

An image processing apparatus includes: a target position selecting unit to select a pixel position on an input image, as a target position; a candidate line setting unit to set two or more sets of candidate lines including a pixel with a value, in the vicinity of the target position; a weighted-value calculating unit to calculate a weighted value that corresponds to a degree of expectation that the target position and the pixel position on the candidate line are on the same pattern; a direction classifying unit to selectively determine a set of candidate lines that are close to a direction of a pattern of the target position in accordance with the weighted value of each pixel on the candidate lines; and a first interpolated-value calculating unit to calculate a pixel value of the target position in accordance with the weighted value of each pixel on the candidate lines.

16 Claims, 25 Drawing Sheets

(56) References Cited

U.S. PATENT DOCUMENTS

| | | | | |
|---|---|---|---|---|
| 2006/0153475 A1* | 7/2006 | Ruggiero | ............... | H04N 7/012 382/276 |
| 2006/0285007 A1* | 12/2006 | Yuyama | ............. | H04N 5/23248 348/362 |
| 2007/0126885 A1* | 6/2007 | Hasegawa | ............. | G06T 3/4015 348/222.1 |
| 2008/0002063 A1* | 1/2008 | Kimura | ..................... | G06T 5/50 348/607 |
| 2009/0046202 A1* | 2/2009 | Huang | ................... | H04N 7/012 348/441 |

FOREIGN PATENT DOCUMENTS

| | | |
|---|---|---|
| JP | 4626007 | 2/2011 |
| JP | 2012-234507 | 11/2012 |

* cited by examiner

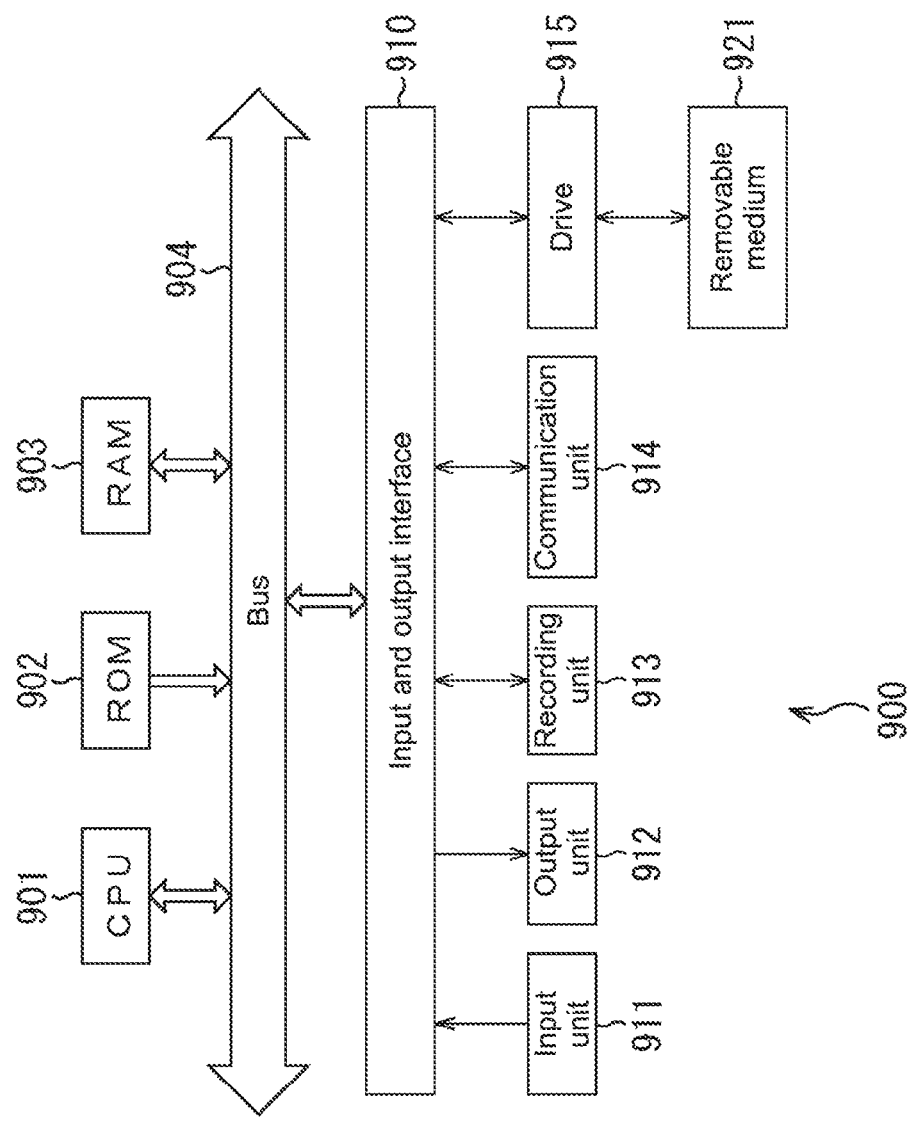

IMAGE PROCESSING APPARATUS, IMAGE PROCESSING METHOD, SOLID-STATE IMAGING DEVICE, AND ELECTRONIC APPARATUS CONFIGURED TO CALCULATE A PIXEL VALUE OF A TARGET POSITION IN ACCORDANCE WITH A WEIGHTED VALUE OF EACH PIXEL ON A CANDIDATE LINE OF A PLURALITY OF CANDIDATE LINES

CROSS REFERENCE TO RELATED APPLICATIONS

This application claims the benefit of Japanese Priority Patent Application JP 2013-244948 filed Nov. 27, 2013, the entire contents of which are incorporated herein by reference.

BACKGROUND

The present disclosure relates to an image processing apparatus, an image processing method, a solid-state imaging device, and an electronic apparatus, and more particularly, to an image processing apparatus, an image processing method, a solid-state imaging device, and an electronic apparatus that are capable of obtaining an image with sharpness and less jaggies.

In the past, a technique of interpolating pixel values has been used when an image is enlarged, for example. As a simple technique of achieving pixel value interpolation, there is a technique of using a lowpass filter to calculate a value of an interpolation target position. With this technique, jaggies easily occur in interpolation results. Further, when a cutoff frequency is set to be low in order to prevent the generation of jaggies, an output image is blurred.

In order to solve such phenomena, various techniques are proposed. For example, there is proposed a technique of obtaining a provisional value by interpolation processing and then determining directionality based on difference values in a horizontal direction and a perpendicular direction with respect to each target position and weighting an operator in that direction, thus reducing jaggies (see, for example, Japanese Patent Application Laid-open No. 2010-055410).

Further, as a technique of performing smoothing with a weighing operator according to directionality with respect to an image that has been subjected to interpolation, there is also proposed a technique of determining the directionality by comparing pixel values of positions that are point symmetric to each other with respect to a target position or comparing the target position and those pixel values (see, for example, Japanese Patent No. 4626007).

Furthermore, a technique of determining a pixel for interpolation by using block matching is known. For example, a technique of enlarging an image in one direction, which is intended to be applied to I/P conversion and the like, is proposed (see, for example, Japanese Patent No. 4343255). Moreover, a technique of reducing the generation of jaggies by superimposing pixel values at appropriate positions with respect to the target position (see, for example, Japanese Patent Application Laid-open No. 2012-234507).

SUMMARY

Although various techniques have been proposed in the past as described above, a technique for reliably reducing the generation of jaggies and preventing an output image from being blurred has not been established.

Specifically, in the technique of Japanese Patent Application Laid-open No. 2010-055410, in which a direction is determined based on the difference values in a horizontal direction and a perpendicular direction with respect to each target position, the operator is weighted in that direction, and thus jaggies are reduced, the angle of a corresponding pattern is limited and thus its accuracy is limited.

Further, in the technique of Japanese Patent No. 4626007, in which the determination of directionality is performed by comparing pixel values of positions that are point symmetric to each other with respect to a target position or comparing the target position and those pixel values, a corresponding angle is limited in the case of this technique as well, and additionally an image is easy to blur because the image obtained after interpolation is smoothed.

In the technique of Japanese Patent No. 4343255, in which similarities of positions that are point symmetric to each other with respect to the target position are sequentially calculated by block matching, a pixel on the same pattern as the target position is searched for and an interpolated value is obtained with an average of those pixels. In the case where the pattern at the target position has a sharp angle close to an enlarging direction, however, it is difficult to cope with this case.

The technique of Japanese Patent Application Laid-open No. 2012-234507 is for searching for a pixel position (jaggy reversed phase position) that is located on the same pattern as the target position and effectively cancels jaggies at the target position. This search range is set so as to correspond to angles of many patterns and also configured to search for a position that can be a jaggy reversed phase position in principle. This can reduce calculation costs, but has a possibility that an output image is blurred because superposition of pixel values is performed on an interpolated image.

The present disclosure has been made in view of such circumstances and it is desirable to obtain an image with sharpness and less jaggies by reliably reducing the generation of jaggies and preventing an output image from being blurred.

According to a first embodiment of the present disclosure, there is provided an image processing apparatus including a target position selecting unit, a candidate line setting unit, a weighted-value calculating unit, a direction classifying unit, and a first interpolated-value calculating unit. The target position selecting unit is configured to select a pixel position on an input image, as a target position in which a pixel value is interpolated. The candidate line setting unit is configured to set two or more sets of candidate lines including a pixel with a value, in the vicinity of the target position. The weighted-value calculating unit is configured to calculate a weighted value that corresponds to a degree of expectation that the target position and the pixel position on the candidate line are on the same pattern. The direction classifying unit is configured to selectively determine a set of candidate lines that are close to a direction of a pattern of the target position in accordance with the weighted value of each pixel on the candidate lines. The first interpolated-value calculating unit is configured to calculate a pixel value of the target position in accordance with the weighted value of each pixel on the candidate lines.

The first interpolated-value calculating unit may be configured to set an interpolated value smoothed in an extending direction of the candidate lines, as a provisional pixel value for interpolation, in a pixel without a value on the candidate lines, and then calculate the pixel value of the target position.

The first interpolated-value calculating unit may be configured to calculate the pixel value of the target position by using only a pixel on the candidate lines that are close to the direction of the pattern of the target position.

The first interpolated-value calculating unit may be configured to calculate an interpolated value for each of the sets of candidate lines. The image processing apparatus may further include an interpolated-value selecting unit configured to select an interpolated value calculated from pixels on the candidate lines that are close to the direction of the pattern of the target position, from interpolated values calculated for the respective sets of candidate lines.

The image processing apparatus may further include a second interpolated-value calculating unit, a pattern classifying unit, and an interpolated-value selecting unit. The second interpolated-value calculating unit is configured to calculate an interpolated value in which the direction of the pattern of the target position is not taken into consideration. The pattern classifying unit is configured to classify the pattern of the target position in accordance with the weighted value of each pixel on the candidate lines. The interpolated-value selecting unit is configured to select one of the interpolated value calculated by the first interpolated-value calculating unit and the interpolated value calculated by the second interpolated-value calculating unit, in accordance with a result of the classification of the pattern of the target position.

The image processing apparatus may further include a pattern classifying unit configured to classify the pattern of the target position in accordance with the weighted value of each pixel on the candidate lines. The first interpolated-value calculating unit may be configured to calculate an interpolated value in accordance with a result of the classification of the pattern of the target position.

The candidate line setting unit may be configured to set the candidate lines to be parallel to each other in each set and to be symmetric to each other with respect to the target position in each set.

The candidate line setting unit may be configured to set the sets of candidate lines to be orthogonal to each other.

The candidate line setting unit may be configured to set the candidate lines to pass through the target position.

The direction of the pattern of the target position may include one of a horizontal direction and a vertical direction on the input image.

The input image may include an image enlarged in at least one of a horizontal direction and a vertical direction.

The input image may include an image obtained from an output value of a solid-state imaging device using a color filter array including a predetermined array.

The input image may include an image including a defect pixel of a solid-state imaging device.

The image processing apparatus according to the first embodiment of the present disclosure may be an independent apparatus or internal blocks forming one apparatus.

An image processing method according to the first embodiment of the present disclosure is an image processing method that corresponds to the image processing apparatus according to the first embodiment of the present disclosure described above.

In the image processing apparatus and the image processing method according to the first embodiment of the present disclosure, a pixel position on an input image is selected as a target position in which a pixel value is interpolated, two or more sets of candidate lines including a pixel with a value are set in the vicinity of the target position, a weighted value that corresponds to a degree of expectation that the target position and the pixel position on the candidate line are on the same pattern is calculated, a set of candidate lines that are close to a direction of a pattern of the target position is selectively determined in accordance with the weighted value of each pixel on the candidate lines, and a pixel value of the target position is calculated in accordance with the weighted value of each pixel on the candidate lines.

According to a second embodiment of the present disclosure, there is provided a solid-state imaging device including a pixel array unit and a signal processing unit. The pixel array unit is configured to regularly dispose pixels in a matrix, the pixels corresponding to a plurality of respective color components. The signal processing unit is configured to perform predetermined signal processing on a pixel signal from the pixel array unit, the signal processing unit including a target position selecting unit configured to select a pixel position on an input image, as a target position in which a pixel value is interpolated, the input image being obtained from the pixel signal from the pixel array unit, a candidate line setting unit configured to set two or more sets of candidate lines including a pixel with a value, in the vicinity of the target position, a weighted-value calculating unit configured to calculate a weighted value that corresponds to a degree of expectation that the target position and the pixel position on the candidate line are on the same pattern, a direction classifying unit configured to selectively determine a set of candidate lines that are close to a direction of a pattern of the target position in accordance with the weighted value of each pixel on the candidate lines, and an interpolated-value calculating unit configured to calculate a pixel value of the target position in accordance with the weighted value of each pixel on the candidate lines.

In the solid-state imaging device according to the second embodiment of the present disclosure, a pixel position on an input image is selected as a target position in which a pixel value is interpolated, two or more sets of candidate lines including a pixel with a value are set in the vicinity of the target position, a weighted value that corresponds to a degree of expectation that the target position and the pixel position on the candidate line are on the same pattern is calculated, a set of candidate lines that are close to a direction of a pattern of the target position is selectively determined in accordance with the weighted value of each pixel on the candidate lines, and a pixel value of the target position is calculated in accordance with the weighted value of each pixel on the candidate lines.

According to a third embodiment of the present disclosure, there is provided an electronic apparatus including a solid-state imaging device and an image processing unit. The solid-state imaging device includes a pixel array unit configured to regularly dispose pixels in a matrix, the pixels corresponding to a plurality of respective color components, and a signal processing unit configured to perform predetermined signal processing on a pixel signal from the pixel array unit. The image processing unit includes a target position selecting unit configured to select a pixel position on an input image, as a target position in which a pixel value is interpolated, the input image being obtained from the pixel signal from the solid-state imaging device, a candidate line setting unit configured to set two or more sets of candidate lines including a pixel with a value, in the vicinity of the target position, a weighted-value calculating unit configured to calculate a weighted value that corresponds to a degree of expectation that the target position and the pixel position on the candidate line are on the same pattern, a direction classifying unit configured to selectively determine a set of candidate lines that are close to a direction of a pattern of the target position in accordance with the weighted value of each pixel on the candidate lines, and an interpolated-value calculating unit configured to calculate a pixel value of the target position in accordance with the weighted value of each pixel on the candidate lines.

In the electronic apparatus according to the third embodiment of the present disclosure, a pixel position on an input image is selected as a target position in which a pixel value is interpolated, two or more sets of candidate lines including a pixel with a value are set in the vicinity of the target position, a weighted value that corresponds to a degree of expectation that the target position and the pixel position on the candidate line are on the same pattern is calculated, a set of candidate lines that are close to a direction of a pattern of the target position is selectively determined in accordance with the weighted value of each pixel on the candidate lines, and a pixel value of the target position is calculated in accordance with the weighted value of each pixel on the candidate lines.

According to the first to third embodiments of the present disclosure, it is possible to obtain an image with sharpness and less jaggies.

It should be noted that effects disclosed herein are not necessarily limited and any effect disclosed herein may be produced.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 19A and 19B are each a diagram for describing the demosaic processing in the third embodiment;

FIG. 27 is a diagram showing a configuration of a computer in a seventh embodiment.

DETAILED DESCRIPTION OF EMBODIMENTS

Hereinafter, embodiments of the present disclosure will be described with reference to the drawings. It should be noted that the description will be given in the following order.

1. First Embodiment: Basic Form (Pixel value interpolation processing using smoothing component in direction close to pattern of target position)

2. Second Embodiment: Application (Basic Form+Pattern classification processing)

3. Third Embodiment: Demosaic processing for output value of image sensor

4. Fourth Embodiment: Pixel value interpolation processing of defect pixel of image sensor 5. Fifth Embodiment: Solid-state imaging device 6. Sixth Embodiment: Electronic apparatus 7. Seventh Embodiment: Program <1. First Embodiment>

(Configuration Example of Image Processing Apparatus)

Figure 1:
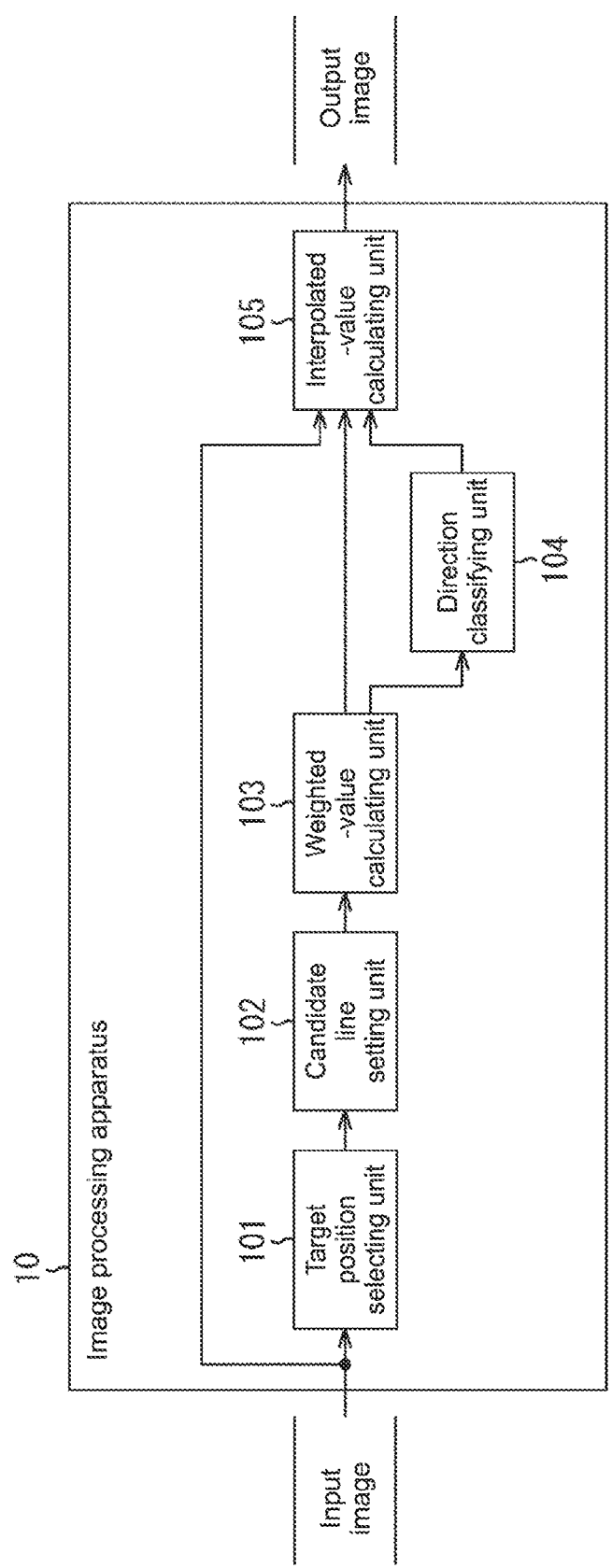
FIG. 1 is a diagram showing a configuration of an image processing apparatus in a first embodiment.

FIG. 1 is a diagram showing a configuration of an image processing apparatus in a first embodiment.

As shown in FIG. 1, an image processing apparatus 10 includes a target position selecting unit 101, a candidate line setting unit 102, a weighted-value calculating unit 103, a direction classifying unit 104, and an interpolated-value calculating unit 105.

The target position selecting unit 101 performs processing of selecting a target position on an input image, in which a pixel value is interpolated (hereinafter, referred to as "target position"), and supplying a processing result to the candidate line setting unit 102.

The candidate line setting unit 102 performs processing of setting a candidate line for the input image from which the target position is selected, based on the processing result supplied from the target position selecting unit 101, and supplies a processing result to the weighted-value calculating unit 103. Here, the candidate line refers to a line that is set in order to search for a pixel position located on the same pattern as the target position on the input image.

The weighted-value calculating unit 103 performs processing of calculating a weighted value for each pixel position on the candidate line, based on the processing result supplied from the candidate line setting unit 102. The weighted value corresponds to a degree of expectation of being located on the same pattern as the target position. The weighted-value calculating unit 103 supplies a processing result to the direction classifying unit 104 and the interpolated-value calculating unit 105.

The direction classifying unit 104 performs processing of selectively determining a set of candidate lines that are close to the direction of the pattern of the target position, based on the processing result supplied from the weighted-value calculating unit 103.

In addition to the input image, processing results are supplied from the weighted-value calculating unit 103 and the direction classifying unit 104 to the interpolated-value calculating unit 105. Based on those processing results and the like, the interpolated-value calculating unit 105 performs processing of calculating a pixel value of the target position by using only pixels on the candidate lines that are close to the direction of the pattern of the target position, and outputs an output image obtained based on a processing result to a subsequent stage.

(Example of Image Enlargement)

Figure 2:
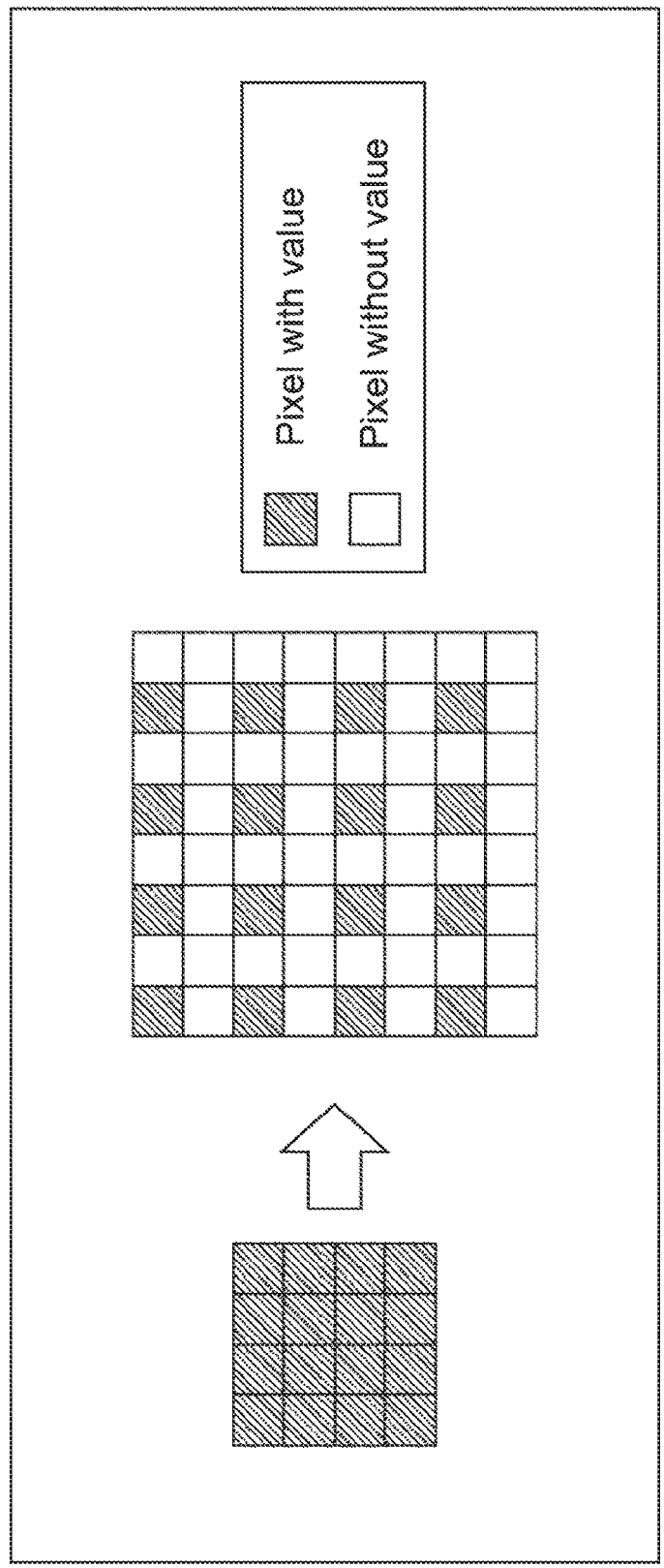
FIG. 2 is a diagram schematically showing an enlarged state of an input image.

FIG. 2 is a diagram schematically showing an enlarged state of an input image. In FIG. 2, a square represents a pixel that forms an image. Of the pixels represented by the squares, pixels with diagonal pattern represent pixels with values (hereinafter, also referred to as "original pixel") and the other pixels represent pixels without values (hereinafter, also referred to as "free pixel"). It should be noted that the input image is enlarged in at least one direction of a horizontal direction and a vertical direction.

In the case where the input image on the left-side part in FIG. 2 is enlarged twice in the horizontal direction and the vertical direction, respectively, the enlarged image on the right-side part in FIG. 2 contains not only the original pixels but also the free pixels. So, it is necessary to fill those free pixels with pixel values by interpolation. In this regard, as an example of pixel value interpolation processing executed by the image processing apparatus 10 of FIG. 1, description will be next given on image enlarging processing in which the input image is enlarged twice in the horizontal direction and the vertical direction, respectively, to generate an output image, with reference to FIGS. 3 to 7.

Figure 3:
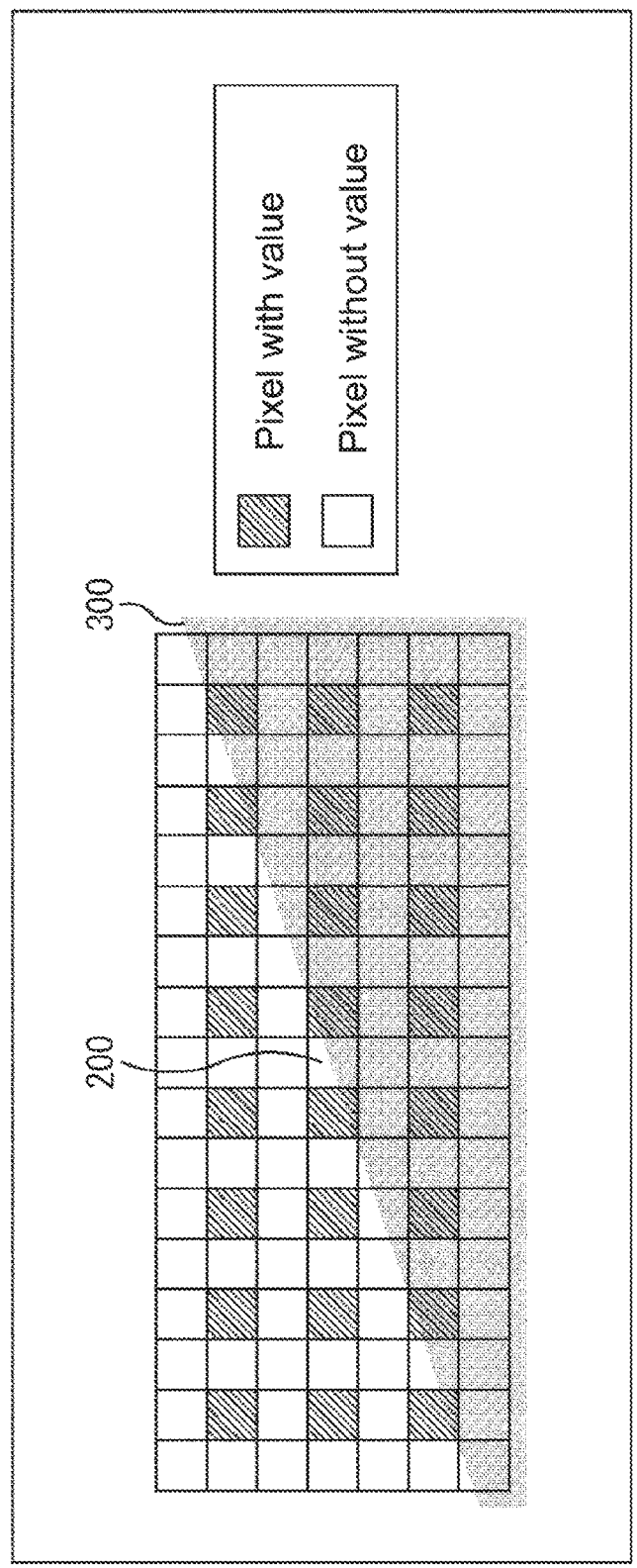
FIG. 3 is a diagram showing a selection example of a target position.

FIG. 3 shows a state before pixel value interpolation is performed, in the case where the input image is enlarged twice in the horizontal direction and the vertical direction, respectively. In FIG. 3, 7 by 17 squares represent pixels that form a part of the input image. Of the pixels represented by the squares, pixels with diagonal pattern represent the original pixels, and the other pixels represent the free pixels. Further, in FIG. 3, a pattern 300 expressed over a plurality of pixels represents a pattern that is desired to be restored in an output image.

The target position selecting unit 101 selects a target position 200, that is, a specific pixel located in the image of FIG. 3, as a target position to be an interpolation target.

Figure 4:
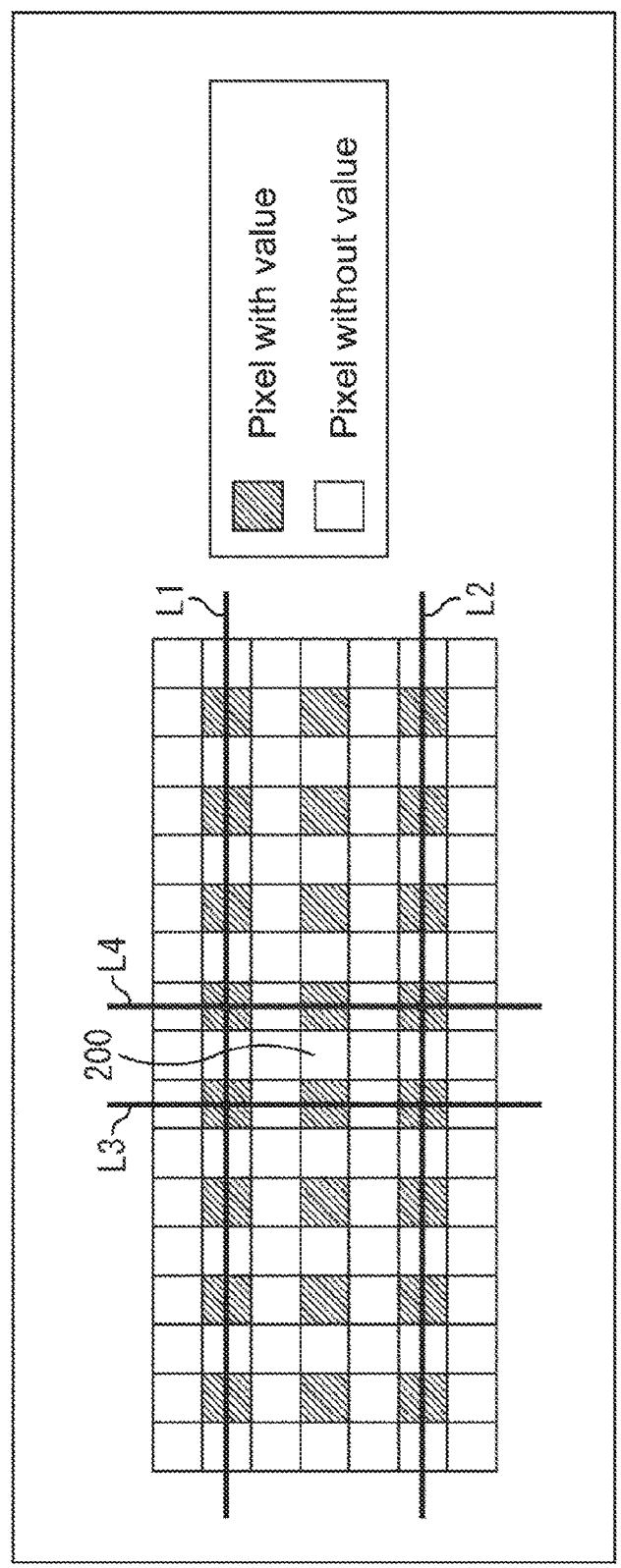
FIG. 4 is a diagram showing a setting example of candidate lines.

Upon selection of the target position 200 by the target position selecting unit 101, as shown in FIG. 4, the candidate line setting unit 102 sets, as candidate lines, two or more sets of candidate lines including two or more original pixels, in the vicinity of the target position 200. Here, the set of candidate lines represents an aggregation including one or more candidate lines. In the setting example of FIG. 4, four candidate lines L1 to L4 are set in the vicinity of the target position 200.

In other words, in the setting example of FIG. 4, a set of candidate lines forming two candidate lines L1 and L2 extending in the horizontal direction and a set of candidate lines forming two candidate lines L3 and L4 extending in the vertical direction are set. Further, the candidate lines in each set are set symmetrically with respect to the target position 200. Furthermore, though details will be described later, the candidate lines in each set are set to be parallel to each other and symmetric to each other with respect to the target position. Thus, in the weighted-value calculating unit 103 in a subsequent stage, the "degree of expectation of being located on the same pattern" of each candidate position can be calculated more correctly.

Upon selection of the candidate lines L1 to L4 by the candidate line setting unit 102, the weighted-value calculating unit 103 calculates the degree of expectation of being located on the same pattern as the target position, for each pixel position of the candidate lines.

The method of calculating the weighted value is not particularly limited, and various techniques such as SSD (Sum of Squared Difference) and SAD (Sum of Absolute Difference) can be used. Here, using the technique used in Japanese Patent Application Laid-open No. 2012-234507 described above, a weight $w_{\Delta p}$ can be calculated by the following expressions (1) to (4) based on similarities of blocks respectively centering on three points, i.e., the target position, a candidate position, and a position that is symmetric to the candidate position with respect to the target position.

$$D_+^2 = \frac{1}{N_\Omega} \sum_{p \in \Omega} (I(p + \Delta p) - I(p))^2 \quad (1)$$

$$D_-^2 = \frac{1}{N_\Omega} \sum_{p \in \Omega} (I(p - \Delta p) - I(p))^2 \quad (2)$$

$$D_o^2 = \frac{1}{N_\Omega} \sum_{p \in \Omega} (I(p + \Delta p) - I(p - \Delta p))^2 \quad (3)$$

$$w_{\Delta p} = k \cdot e^{-\frac{D_+^2}{2\sigma_+}} \cdot e^{-\frac{D_-^2}{2\sigma_-}} \cdot e^{-\frac{D_o^2}{2\sigma_0}} \quad (4)$$

Figure 5:
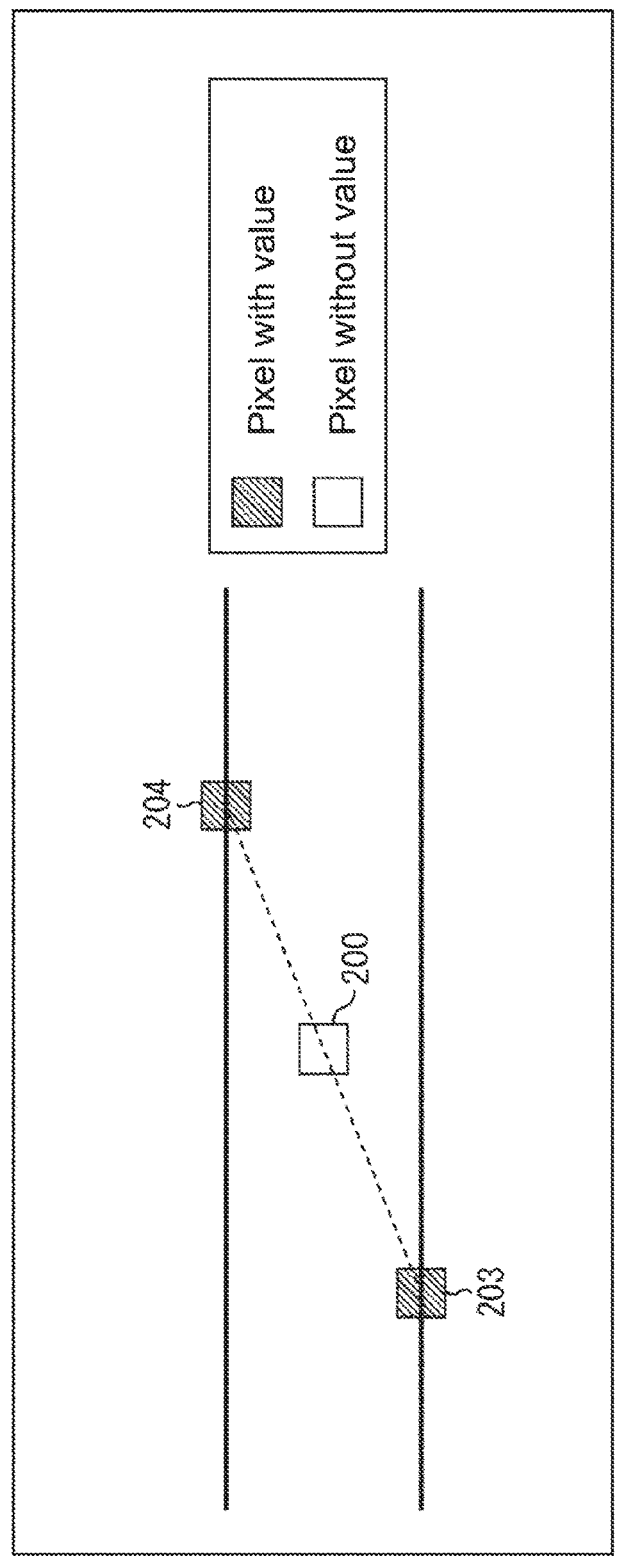
FIG. 5 is a diagram showing a calculation example of a weighted value of a candidate position.

In the expressions (1) to (4), the letter symbols are used in the following meanings.

p: Pixel position
Δp: Vector from pixel position to candidate position
I(p): Pixel value in pixel position p
Ω: Aggregation of pixels belonging to small block of target position
$N_\Omega$: Number of pixels belonging to small block
k, $\sigma_+$, $\sigma_-$, $\sigma_0$: Constant Specifically, as shown in FIG. 5, in the case where a weighted value of a candidate position 203 with respect to the target position 200 is calculated, a block similarity of the target position 200 and the candidate position 203 is represented by $D^2_+$, a block similarity of the target position 200 and a candidate position 204 (position that is point symmetric to the candidate position 203 with respect to the target position 200) is represented by $D^2_-$ and a block similarity of the candidate position 203 and the candidate position 204 is represented by $D^2_0$.

Here, in the case where the candidate pixel is a free pixel without value, a provisional pixel value used in the technique according to an embodiment of the present disclosure is set by smoothing of an adjacent original pixel, or the like.

In such a manner, using the similarities of the target position 200 and the two candidate positions 203 and 204 that are point symmetric to each other with respect to the target position 200, even when jaggies are generated on a provisional interpolation plane for calculation of the weighted value, the influence of jaggies can be reduced and the weighted value can be calculated.

Upon calculation of the weighted value by the weighted-value calculating unit 103, the direction classifying unit 104 compares the sums of the weighted values for each of the sets of candidate lines, and selectively determines a set of candidate lines that are closest to the direction of the pattern. In this example of the image enlarging processing, classification is performed based on whether the pattern of the target position is close to the horizontal direction or the vertical direction. The weighted value described above becomes a higher value as being more expected to be located on the same pattern, and thus a direction with a larger sum of the weighted values is classified as being close to the direction of the pattern.

Figure 6:
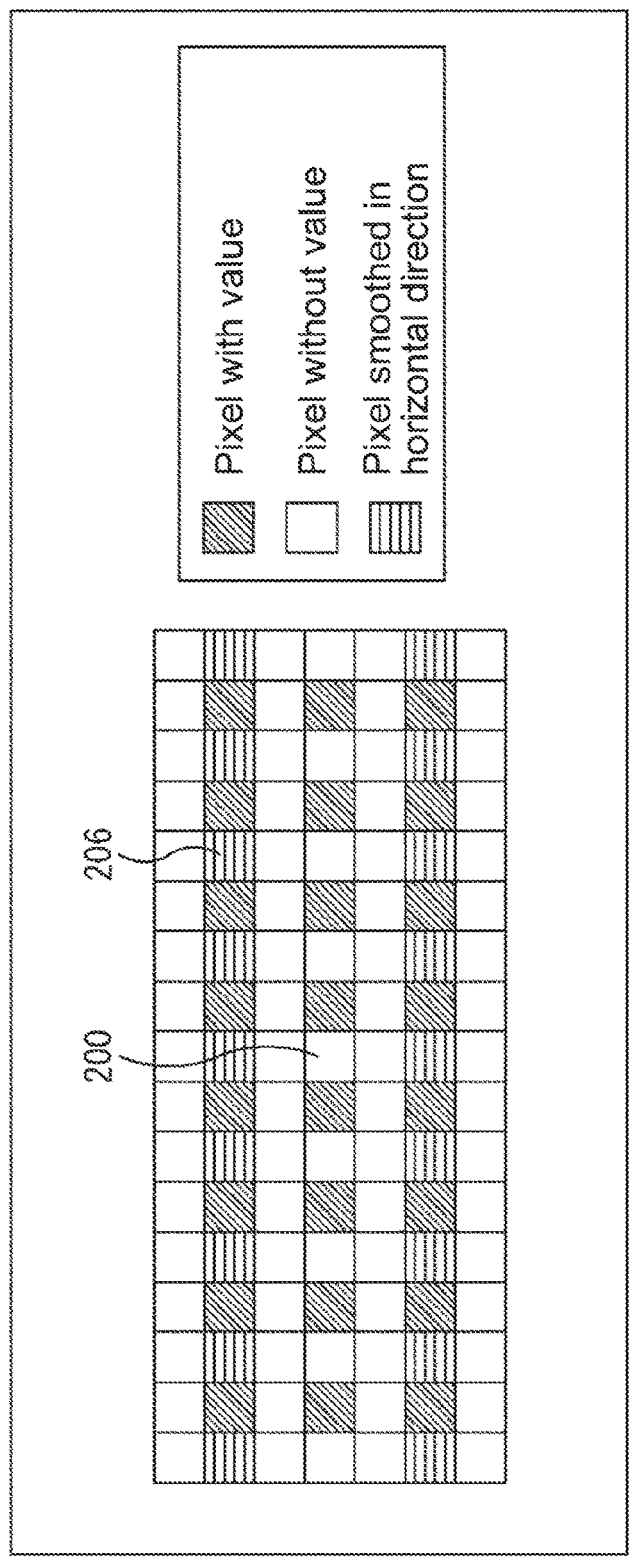
FIG. 6 is a diagram showing an example of a pixel smoothed in accordance with a direction of a pattern.

Upon classification of the direction by the direction classifying unit 104, the interpolated-value calculating unit 105 uses only the pixels of the set of candidate lines that are close to the direction of the pattern of the target position to calculate an interpolated value based on the weighted value of each candidate pixel. Here, as a provisional pixel value for the technique according to an embodiment of the present disclosure, an interpolated value that is smoothed in an extending direction of the candidate line is set for the free pixel on the candidate line. For example, as shown in FIG. 6, in the case where the set of candidate lines that are close to the direction of the pattern of the target position 200 is classified as having the horizontal direction, a smoothing component having the horizontal direction is given like a pixel 206. Thus, it is possible to exclude a smoothing component having a direction to blur the pattern (in the case of FIG. 6, a smoothing component having the vertical direction) from the pixels used for calculating an interpolated value.

Figure 7:
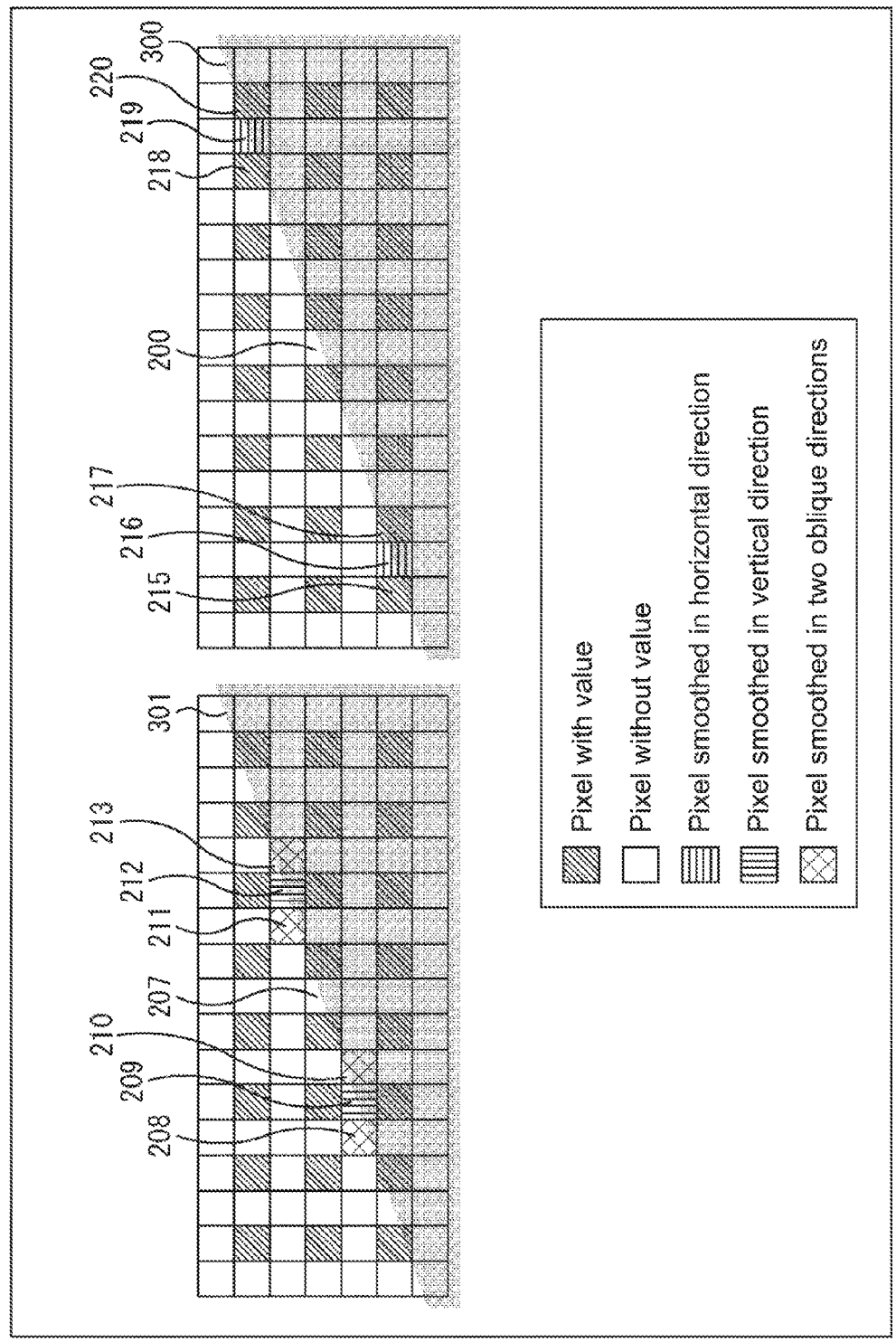
FIG. 7 is a diagram in which interpolation with a smoothing component in the present disclosure and interpolation with a smoothing component in related art are compared.

FIG. 7 is a diagram showing pixels with large weights among candidate pixels used for calculating an interpolated value of the target position. For the purpose of comparison, FIG. 7 shows two cases, that is, a first case (the left-side part of FIG. 7) to which the technique disclosed in Japanese Patent Application Laid-open No. 2012-234507 described above is applied, and a second case (the right-side part of FIG. 7) to which the technique according to an embodiment of the present disclosure is applied. In the first case, a specific pixel is selected as a target position 207. Further, a pattern 301 expressed over a plurality of pixels represents a pattern that is desired to be restored in an output image and is the same pattern as the pattern 300.

In the first case to which the technique disclosed in Japanese Patent Application Laid-open No. 2012-234507 described above is applied, specific pixels (pixels 208 to 210 and pixels 211 to 213 in the left-side part of FIG. 7) are selected from one line above the target position 207 and one line below the target position 207 so as to serve as pixels for interpolation, and pixel values for interpolation are acquired. Since those values are interpolated values obtained from adjacent pixels, those interpolated values contain a smoothing component having the vertical direction in relation to a phase of the target position 207. So, in the first case, an output image obtained as a result of enlarging the input image may be blurred in the vertical direction, that is, in a direction orthogonal to the pattern 301.

On the other hand, in the second case to which the technique according to an embodiment of the present disclosure is applied, an interpolated value is calculated from the original pixels located in the vicinity of the target position 200 (for example, pixels 215 and 217 and pixels 218 and 220 in the right-side part of FIG. 7) or pixels containing a smoothing component having the horizontal direction (for example, pixels 216 and 219 in the right-side part of FIG. 7). Specifically, in the second case, since the pattern 300 is a pattern close to the horizontal direction, when the smoothing component having the vertical direction is included in calculation of the interpolated value, blurring is generated in the resultant output image. For that reason, the interpolated value is calculated from only the original pixels located in the vicinity of the target position 200 or only the pixels containing the smoothing component having the horizontal direction. So, in the second case, in an output image obtained as a result of enlarging the input image, blurring in the vertical direction, that is, in a direction orthogonal to the pattern 300 can be reduced.

In other words, blurring in the direction orthogonal to the pattern is easy to notice in the output image, and thus it is not desirable. For that reason, in the technique according to an embodiment of the present disclosure, the pixel value on the candidate line is formed from only the original pixels or the pixels containing the smoothing component having the direction of the candidate line. Further, since it is necessary to calculate the smoothing component having an extending direction of the candidate line, including two or more original pixels is assumed as a condition of the candidate line in the technique according to an embodiment of the present disclosure.

(Pixel Value Interpolation Processing)

Next, the flow of the pixel value interpolation processing executed by the image processing apparatus 10 of FIG. 1 will be described with reference to a flowchart of FIG. 8.

In Step S101, the target position selecting unit 101 selects a pixel position on the input image, as a target position.

In Step S102, the candidate line setting unit 102 sets two or more sets of candidate lines in the vicinity of the target position on the input image. In the setting processing of the candidate line, two or more sets of candidate lines including two or more original pixels with values are set.

In Step S103, the weighted-value calculating unit 103 selects a pixel position on the candidate line.

In Step S104, the weighted-value calculating unit 103 calculates, for the pixel position selected in the processing in Step S103, a weighted value that corresponds to a degree of expectation of being located on the same pattern as the target position.

In Step S105, the weighted-value calculating unit 103 determines whether the weighted values of all pixel positions on the candidate line are calculated or not. In Step S105, when it is determined that the weighted values of all pixel positions on the candidate line are not calculated, the processing returns back to Step S103 and the processing described above is repeated.

When the calculation on the weights of all pixel positions on the candidate line is completed by repetition of the processing of Steps S103 to S105 and when it is determined in Step S105 that the weights of all pixel positions on the candidate line are calculated, the processing proceeds to Step S106.

In Step S106, based on the sum of weighted values calculated by repetition of the processing of Steps S103 and S104, the direction classifying unit 104 selectively determines a set of candidate lines close to the direction of the pattern of the target position. Here, for example, classification is performed based on whether the pattern of the target position is close to the horizontal direction or the vertical direction.

In Step S107, the interpolated-value calculating unit 105 uses only the pixels on the candidate lines that are close to the direction of the pattern of the target position, which is classified by the processing of Step S106, to calculate a pixel value of the target position.

In Step S108, it is determined whether all of the pixels are selected as target positions by the processing of Step S101. In Step S108, when it is determined that all of the pixels are not selected as target positions, the processing returns back to Step S101 and the processing described above is repeated.

When all of the pixels are selected as target positions by the processing of Step S101 and the interpolated values of the target positions are calculated by repetition of the processing of Steps S101 to S108, and when it is determined in Step S108 that all of the pixels are selected as target positions, the processing proceeds to Step S109.

In Step S109, an output image is generated according to the interpolated values of the respective target positions. When the output image is generated by the processing of Step S109, the pixel value interpolation processing of FIG. 8 is terminated.

Hereinabove, the pixel value interpolation processing executed by the image processing apparatus 10 of FIG. 1 has been described. In the pixel value interpolation processing of FIG. 8, the pixel value of the target position is calculated using the pixels that are located on the candidate lines close to the direction of the pattern of the target position and are the original pixels or pixels with a smoothing component having a direction close to the pattern.

With this operation, as compared with pixel value interpolation processing for providing a smoothing component in which the directionality of the pattern of the target position is not taken into consideration, it is possible to obtain an output image that causes less blurring in the direction orthogonal to the pattern and has sharpness and less jaggies. Further, as compared with the technique of applying smoothing processing after applying the pixel value interpolation processing, in the technique according to an embodiment of the present disclosure, an output image causes less blurring in terms of direct calculation of the interpolated value. Furthermore, a plurality of sets of candidate lines are set, and thus it is possible to search for angles of many patterns at less costs.

<Modified Example of First Embodiment>

(Configuration Example of Image Processing Apparatus)

Figure 9:
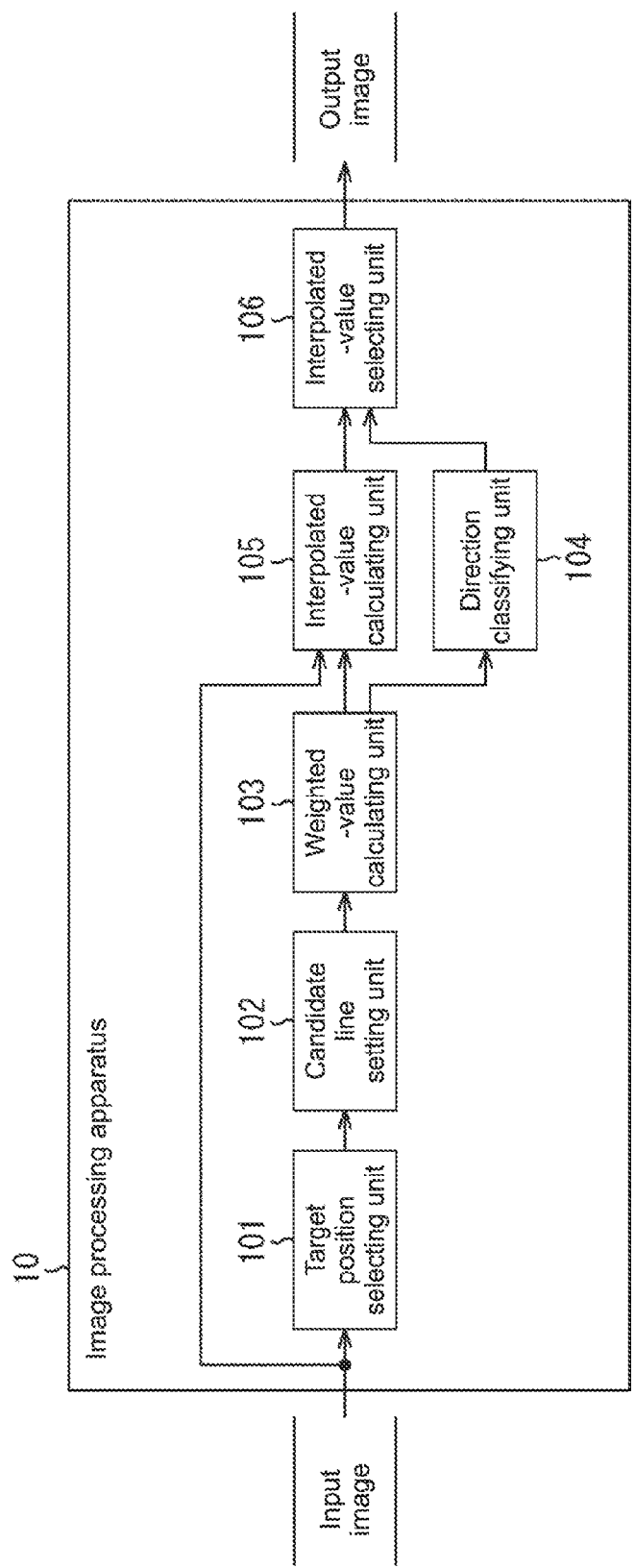
FIG. 9 is a diagram showing another configuration of the image processing apparatus in the first embodiment.

FIG. 9 is a diagram showing another configuration of the image processing apparatus in the first embodiment.

As shown in FIG. 9, an image processing apparatus 10 includes a target position selecting unit 101, a candidate line setting unit 102, a weighted-value calculating unit 103, a direction classifying unit 104, an interpolated-value calculating unit 105, and an interpolated-value selecting unit 106.

In the image processing apparatus 10 of FIG. 9, the interpolated-value selecting unit 106 is newly provided as compared with the image processing apparatus 10 of FIG. 1. In FIG. 9, the target position selecting unit 101, the candidate line setting unit 102, the weighted-value calculating unit 103, and the direction classifying unit 104 perform the same processing as the target position selecting unit 101, the candidate line setting unit 102, the weighted-value calculating unit 103, and the direction classifying unit 104 of FIG. 1.

In addition to an input image, a processing result is supplied from the weighted-value calculating unit 103 to the interpolated-value calculating unit 105. Based on the processing result from the weighted-value calculating unit 103 and the like, the interpolated-value calculating unit 105 performs processing of calculating an interpolated value for each set of candidate lines and supplies a processing result to the interpolated-value selecting unit 106.

Processing results from the direction classifying unit 104 and the interpolated-value calculating unit 105 are supplied to the interpolated-value selecting unit 106. The interpolated-value selecting unit 106 performs processing of selecting a calculation result of the interpolated value of the candidate lines that are close to the pattern of the target position, among calculation results of interpolated values for the respective sets of candidate lines, and outputs an output image obtained based on a processing result to a subsequent stage.

(Pixel Value Interpolation Processing)

Next, the flow of the pixel value interpolation processing executed by the image processing apparatus 10 of FIG. 9 will be described with reference to the flowchart of FIG. 10.

Figure 8:
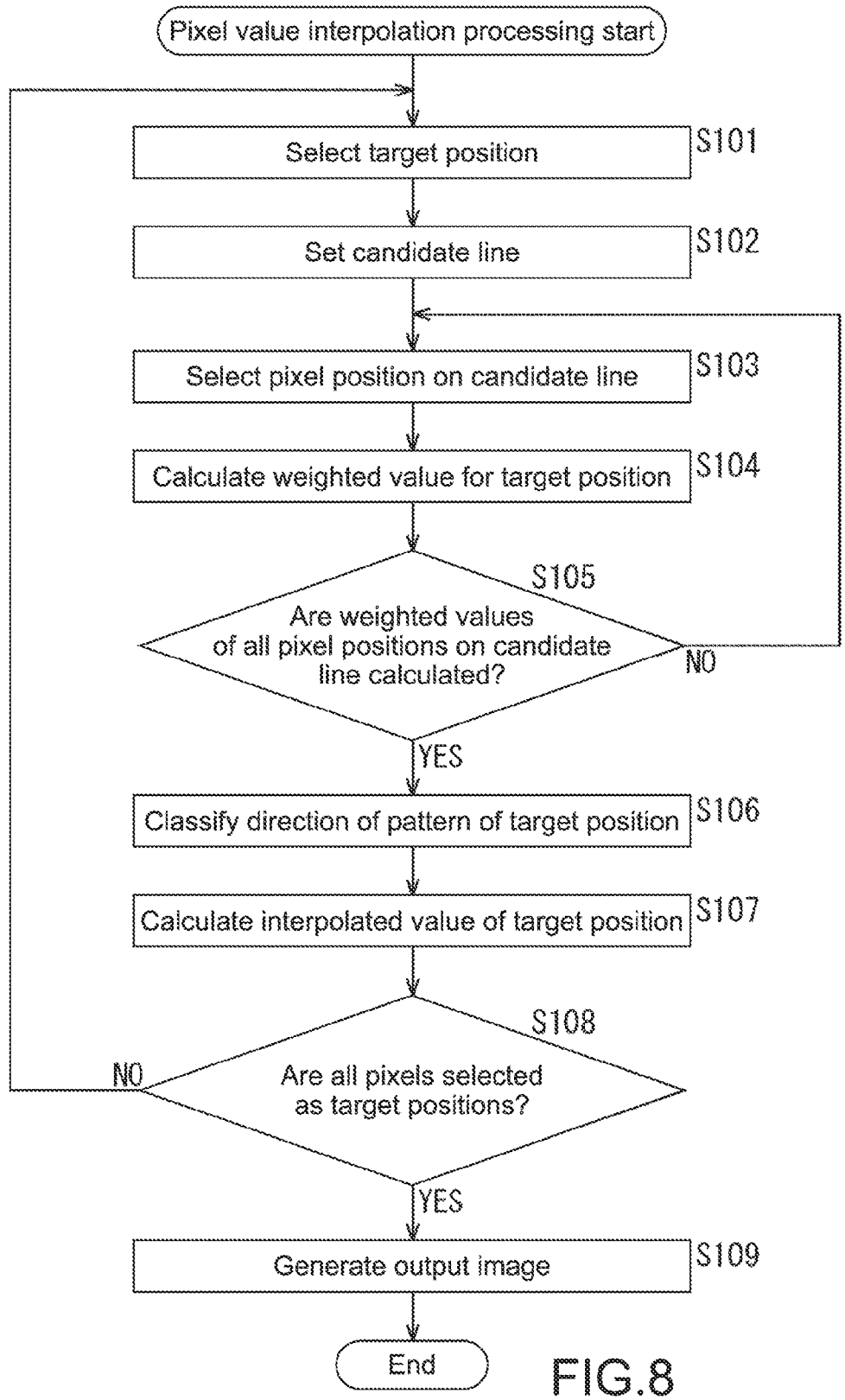
FIG. 8 is a flowchart for describing the flow of pixel value interpolation processing in the first embodiment.

In Steps S121 to S125, as in Steps S101 to S105 of FIG. 8, candidate lines for the target position are set and weighted values of all of pixel positions on the candidate lines are calculated.

In Step S126, based on the sum of weighted values calculated by repetition of the processing of Steps S123 and S124, the interpolated-value calculating unit 105 calculates an interpolated value for each set of candidate lines.

In Step S127, based on the sum of weighted values calculated by repetition of the processing of Steps S123 and S124, the direction classifying unit 104 selectively determines a set of candidate lines close to the direction of the pattern of the target position.

In Step S128, according to the processing result of Step S127, the interpolated-value selecting unit 106 selects a calculation result of the interpolated value of the candidate lines that are close to the pattern of the target position, among calculation results of interpolated values for the respective sets of candidate lines, which are calculated by the processing of Step S126.

In Step S129, as in Step S108 of FIG. 8, it is determined whether all of the pixels are selected as target positions by the processing of Step S121. When it is determined that all of the pixels are not selected as target positions, the processing returns back to Step S121 and the processing described above is repeated.

When all of the pixels are selected as target positions by the processing of Step S121 and the interpolated values of the target positions are selected by repetition of the processing of Steps S121 to S129, and when it is determined in Step S129 that all of the pixels are selected as target positions, the processing proceeds to Step S130.

In Step S130, an output image is generated according to the interpolated values of the respective target positions. When the output image is generated by the processing of Step S130, the pixel value interpolation processing of FIG. 10 is terminated.

Hereinabove, the pixel value interpolation processing executed by the image processing apparatus 10 of FIG. 9 has been described. In the pixel value interpolation processing of FIG. 10, the interpolated value of each set of candidate lines is calculated, and a calculation result of the interpolated value of the candidate lines that are close to the pattern of the target position is selected among calculation results of interpolated values for the respective sets of candidate lines.

With this operation, as compared with the pixel value interpolation processing for providing a smoothing component in which the directionality of the pattern of the target position is not taken into consideration, it is possible to obtain an output image that causes less blurring in the direction orthogonal to the pattern and has sharpness and less jaggies.

(Another Setting Example of Setting Processing of Candidate Line)

Figure 10:
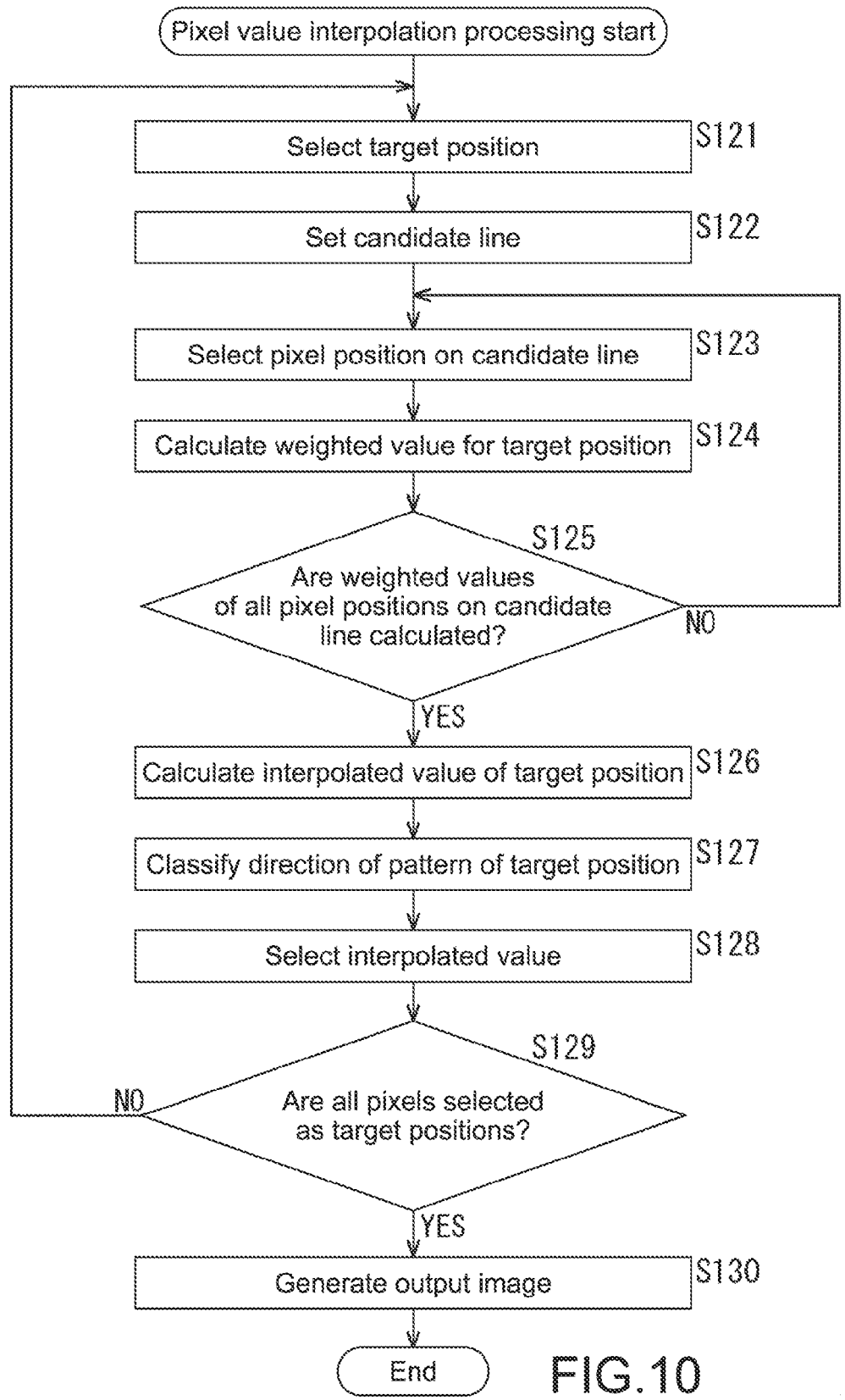
FIG. 10 is a flowchart for describing the flow of the pixel value interpolation processing in the first embodiment.

In the above-mentioned setting processing of the candidate lines in Step S102 of FIG. 8 and Step S122 of FIG. 10, the sets of candidate lines are extended in the horizontal direction and the vertical direction as shown in FIG. 4, but the extending directions thereof are not limited.

For example, in FIG. 4, assuming that the horizontal direction is an X axis and the vertical direction is a Y axis, the candidate lines L1 and L2 are tilted in a direction of 45 degrees, while the candidate lines L3 and L4 are tilted in a direction of 135 degrees, for example. Those candidate lines can be tilted in any directions. Further, the number of sets of candidate lines is set to two in the above description, but it is not limited thereto. For example, any number of sets, such as four sets of candidate lines can be set for each of four directions including the horizontal direction, the vertical direction, the direction of 45 degrees, and the direction of 135 degrees.

Figure 11:
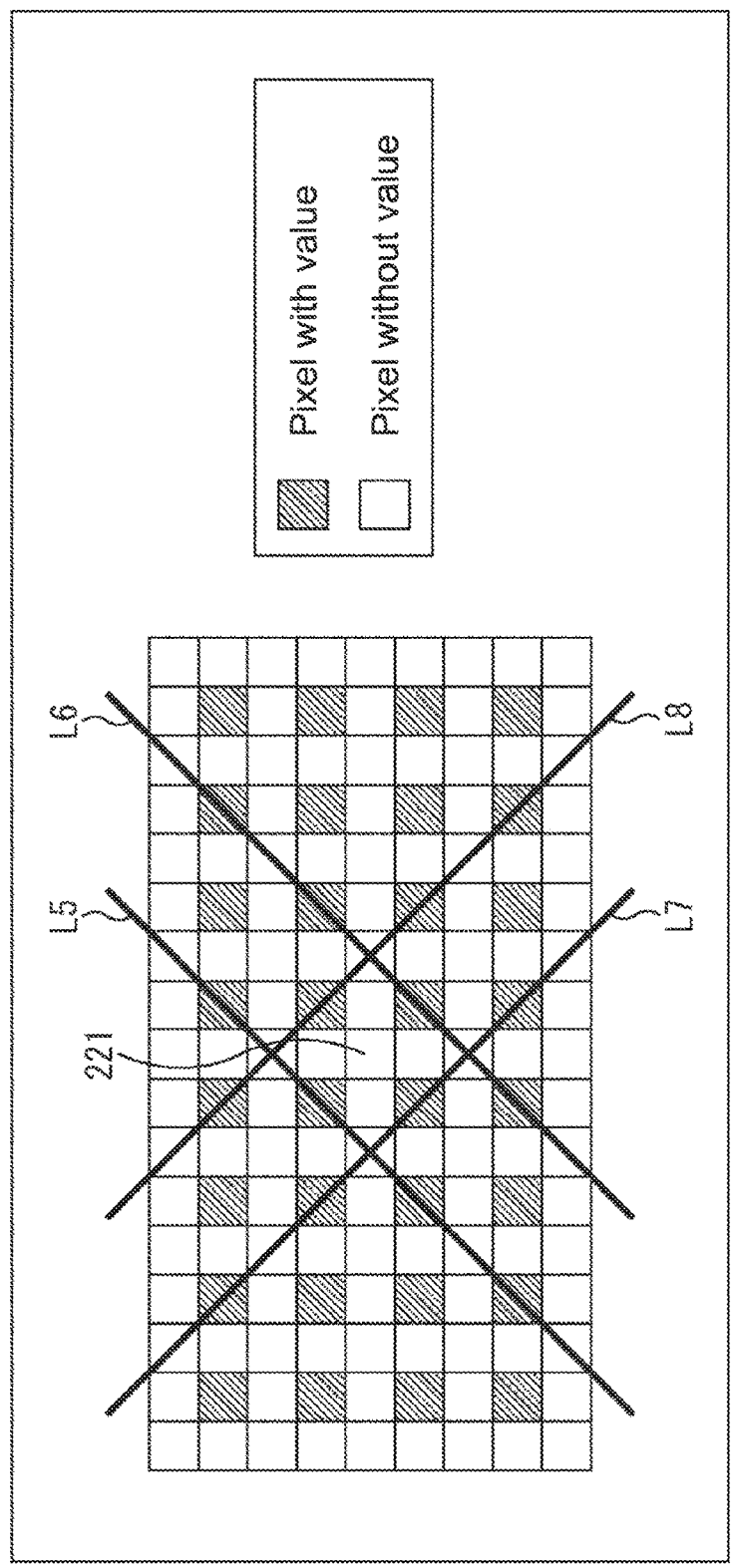
FIG. 11 is a diagram showing a case where candidate lines in each set are tilted.

Further, in the setting processing of the candidate lines, a candidate line passing through the target position may be set. For example, in FIG. 11, assuming that the horizontal direction is an X axis and the vertical direction is an Y axis, a set of candidate lines formed of two candidate lines L5 and L6 extending in the direction of 45 degrees with respect to a target position 221 and a set of candidate lines formed of two candidate lines L7 and L8 extending in the direction of 135 degrees with respect to the target position 221 are set.

Figure 12:
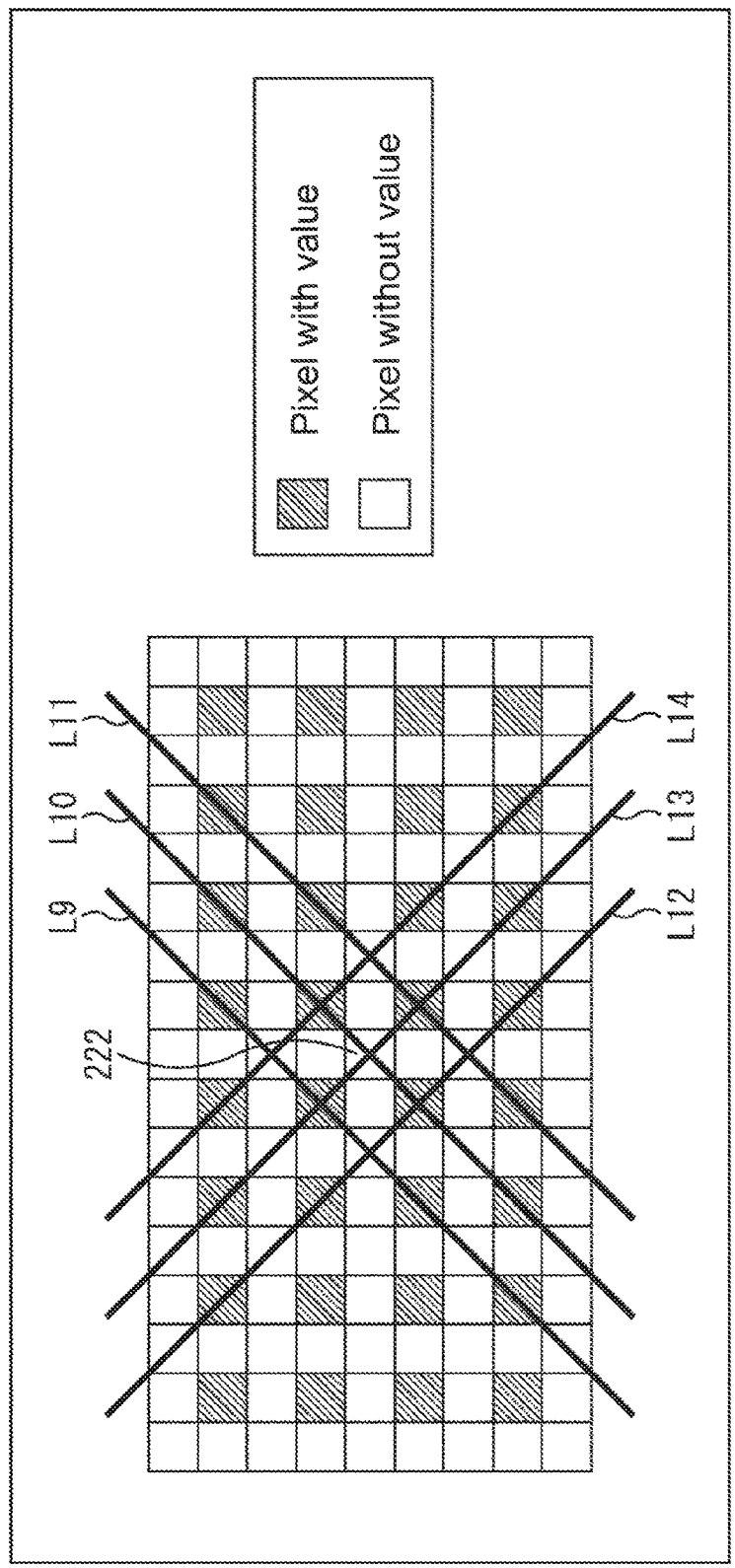
FIG. 12 is a diagram showing a case where candidate lines pass through a target position.

In contrast, FIG. 12 shows an example in the case where candidate lines passing through a target position 222 are added, and a set of three candidate lines L9 to L1 extending in the same direction and a set of three candidate lines L12 to L14 extending in the same direction are set. In this example, the candidate line L10 in the set of candidate lines L9 to L11 passes through the target position 222, and the candidate line L13 in the set of candidate lines L12 to L14 passes through the target position 222.

In such a manner, when the candidate lines L10 and L13 passing through the target position 222 are set, it is also possible to cope with the case where the angle of the pattern (for example, pattern 300 of FIG. 3) is set to 45 degrees or 135 degrees.

<2. Second Embodiment>

(Configuration Example of Image Processing Apparatus)

Figure 13:
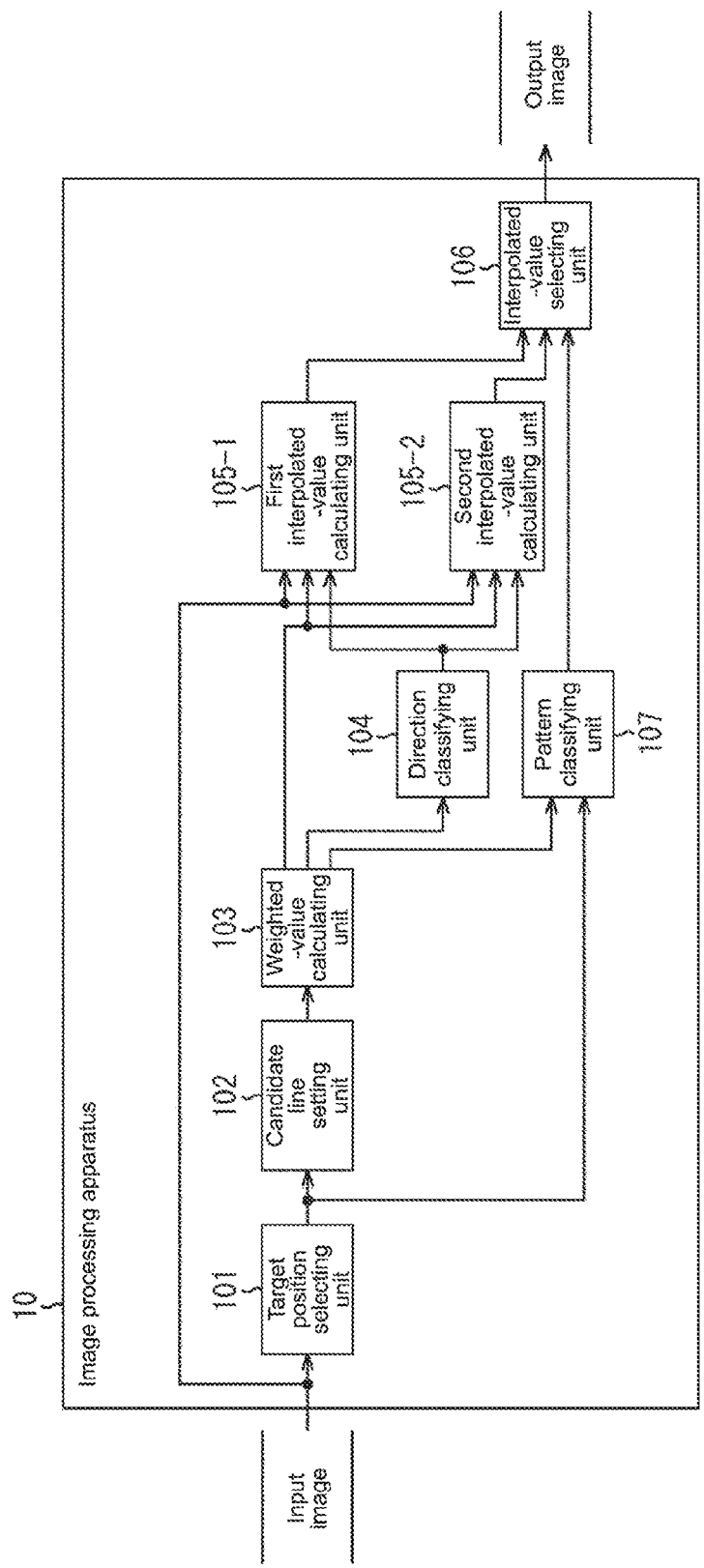
FIG. 13 is a diagram showing a configuration of an image processing apparatus in a second embodiment.

FIG. 13 is a diagram showing a configuration of an image processing apparatus in a second embodiment.

As shown in FIG. 13, an image processing apparatus 10 includes a target position selecting unit 101, a candidate line setting unit 102, a weighted-value calculating unit 103, a direction classifying unit 104, a first interpolated-value calculating unit 105-1, a second interpolated-value calculating unit 105-2, an interpolated-value selecting unit 106, and a pattern classifying unit 107.

In the image processing apparatus 10 of FIG. 13, the first interpolated-value calculating unit 105-1 and the second interpolated-value calculating unit 105-2 are provided instead of the interpolated-value calculating unit 105, and the interpolated-value selecting unit 106 and the pattern classifying unit 107 are newly provided, as compared with the image processing apparatus 10 of FIG. 1. In FIG. 13, the target position selecting unit 101, the candidate line setting unit 102, the weighted-value calculating unit 103, and the direction classifying unit 104 perform the same processing as the target position selecting unit 101, the candidate line setting unit 102, the weighted-value calculating unit 103, and the direction classifying unit 104 of FIG. 1.

In addition to an input image, processing results are supplied from the weighted-value calculating unit 103 and the direction classifying unit 104 to the first interpolated-value calculating unit 105-1. Based on those processing results and the like, the first interpolated-value calculating unit 105-1 performs processing of calculating a pixel value of the target position by using only pixels on the candidate lines that are close to the direction of the pattern of the target position, and supplies a processing result to the interpolated-value selecting unit 106. It should be noted that hereinafter an interpolated value obtained by this interpolated-value calculation processing is referred to as an "interpolated value 1".

In addition to the input image, processing results are supplied from the weighted-value calculating unit 103 and the direction classifying unit 104 to the second interpolated-value calculating unit 105-2. Based on those processing results and the like, the second interpolated-value calculating unit 105-2 performs smoothing processing (isotropic filtering) by a lowpass filter, for example, and supplies a processing result to the interpolated-value selecting unit 106. It should be noted that hereinafter an interpolated value obtained by this interpolated-value calculation processing is referred to as an "interpolated value 2".

Processing results are supplied from the target position selecting unit 101 and the weighted-value calculating unit 103 to the pattern classifying unit 107. Based on those processing results, the pattern classifying unit 107 performs processing of classifying the pattern of the target position by using weighted values of the respective pixels on the candidate lines and supplies a processing result to the interpolated-value selecting unit 106.

Processing results are supplied from the first interpolated-value calculating unit 105-1, the second interpolated-value calculating unit 105-2, and the pattern classifying unit 107 to the interpolated-value selecting unit 106. The interpolated-value selecting unit 106 determines whether the pattern of the target position is an edge area, based on the processing result from the pattern classifying unit 107. According to a determination result, in the case where the target position is in an edge area, the interpolated-value selecting unit 106 selects the interpolated value 1, which is supplied from the first interpolated-value calculating unit 105-1, and in the case where the target position is in a flat area, the interpolated-value selecting unit 106 selects the interpolated value 2, which is supplied from the second interpolated-value calculating unit 105-2. Using the interpolated value selected in such a manner, an output image is generated and output to a subsequent stage.

(Pattern Classification Processing)

Next, pattern classification processing by the pattern classifying unit 107 of FIG. 13 will be described in detail.

Figure 14:
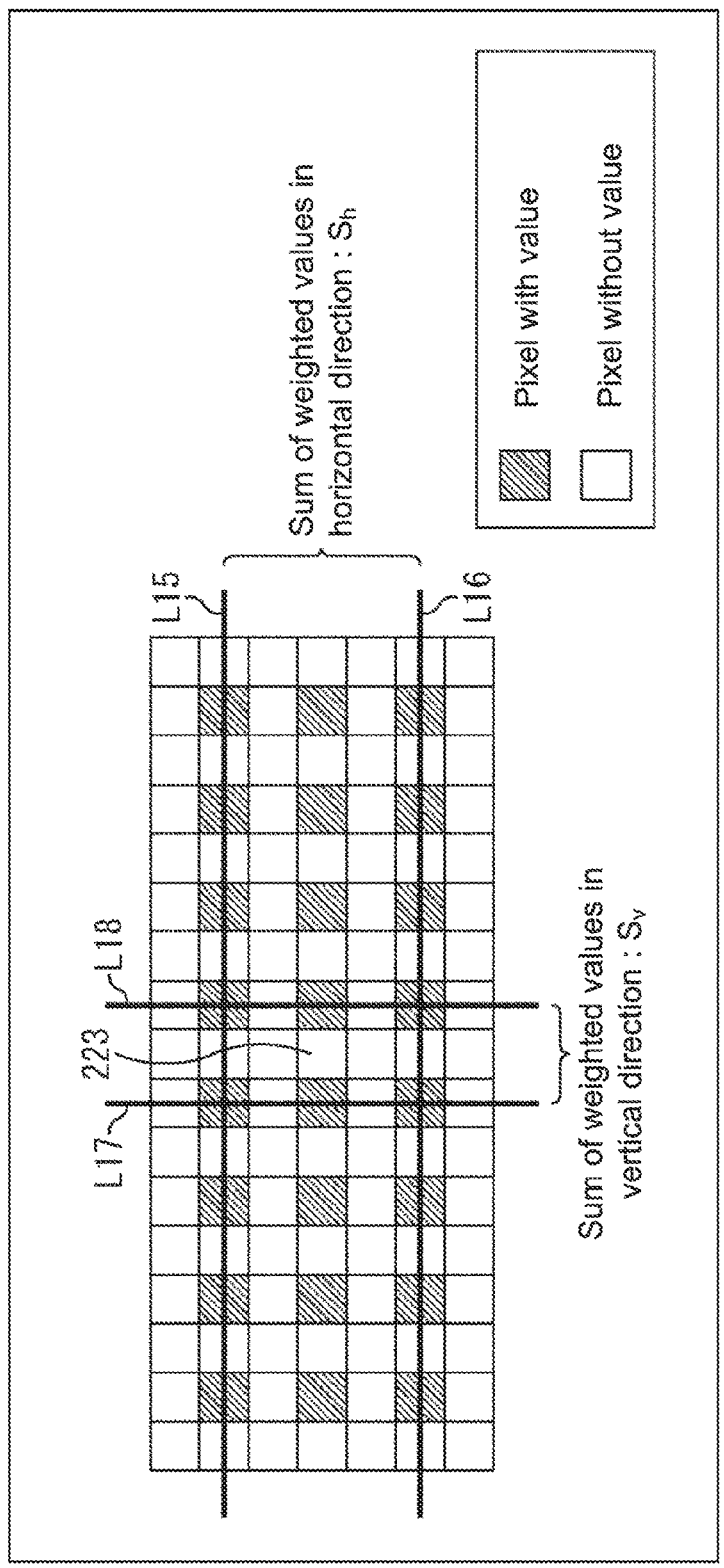
FIG. 14 is a diagram for describing details of pattern classification processing.

In pattern classification processing by the pattern classifying unit 107, the weighted values of respective pixels on the candidate lines are used to classify the pattern of the target position. As shown in FIG. 14, in the case where among two sets of candidate lines, one set (candidate lines L15 and L16) extends in the horizontal direction and the other set (candidate lines L17 and L18) extends in the vertical direction, the sum of weighted values in the horizontal direction is represented by $S_h$, and the sum of weighted values in the vertical direction is represented by $S_v$. Here, for example, in the case where a threshold th is previously determined, it is possible to determine that the target position is in a flat pattern when $|S_v-S_h|<th$, while the target position is in an area of an edge portion when $|S_v-S_h|\geq th$.

In the configuration of FIG. 13, according to a pattern classification result by the pattern classifying unit 107, in the case where the target position is in an edge area, the interpolated-value selecting unit 106 outputs the interpolated value 1, which is calculated by the first interpolated-value calculating unit 105-1, and in the case where the target position is in a flat area, the interpolated-value selecting unit 106 outputs the interpolated value 2, which is calculated by the second interpolated-value calculating unit 105-2. In such a manner, when the edge area and the flat area are classified and a correction value is output, an output of an edge area with sharpness and an output of a flat area involving a noise reduction effect by averaging can be obtained.

It should be noted that in the configuration of FIG. 13, it may be possible to set three or more interpolated-value calculating units in parallel without limiting to the first interpolated-value calculating unit 105-1 and the second interpolated-value calculating unit 105-2 and it may be possible for the interpolated-value selecting unit 106 to select an appropriate interpolated value among interpolated values calculated by those interpolated-value calculating units.

(Pixel Value Interpolation Processing)

Figure 15:
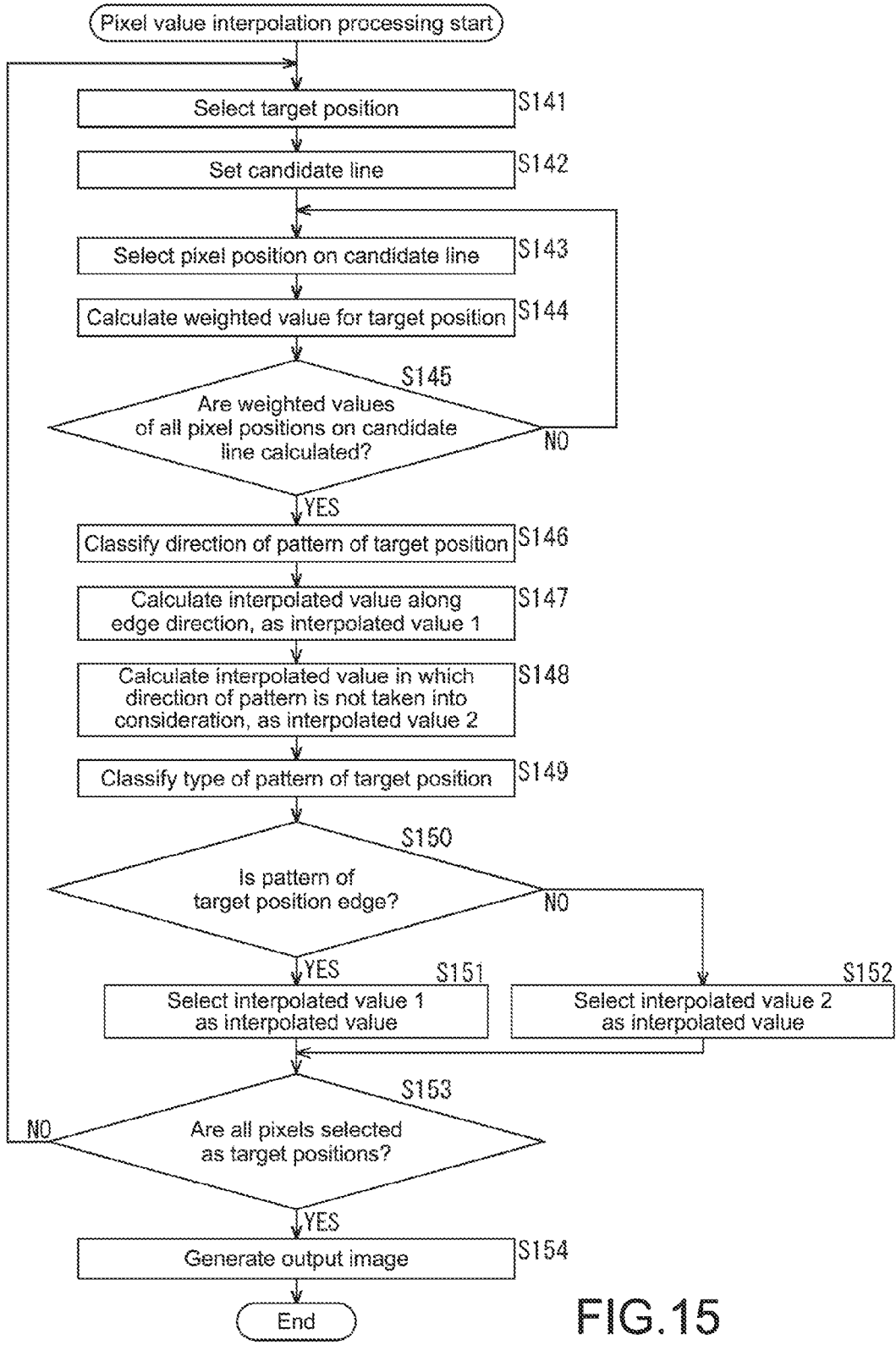
FIG. 15 is a flowchart for describing the flow of pixel value interpolation processing in the second embodiment.

Next, the flow of the pixel value interpolation processing executed by the image processing apparatus 10 of FIG. 13 will be described with reference to the flowchart of FIG. 15.

In Steps S141 to S145, as in Steps S101 to S105 of FIG. 8, candidate lines for the target position are set and weighted values of all of pixel positions on the candidate lines are calculated.

In Step S146, based on the sum of weighted values calculated by repetition of the processing of Steps S143 and S144, the direction classifying unit 104 selectively determines a set of candidate lines close to the direction of the pattern of the target position.

In Step S147, the first interpolated-value calculating unit 105-1 calculates an interpolated value along an edge direction, as the interpolated value 1, by using only the pixels on the candidate lines close to the direction of the pattern of the target position.

In Step S148, the second interpolated-value calculating unit 105-2 performs smoothing processing by a lowpass filter and calculates an interpolated value in which a direction of the pattern of the target position is not taken into consideration, as the interpolated value 2.

In Step S149, the pattern classifying unit 107 classifies the type of pattern of the target position by using the weighted values of the respective pixels on the candidate lines.

In Step S150, the pattern classifying unit 107 determines whether the pattern of the target position is an edge or not. In Step S150, when it is determined that the pattern of the target position is an edge, the processing proceeds to Step S151. In Step S151, the interpolated-value selecting unit 106 selects the interpolated value 1 as the interpolated value among the interpolated value 1 and the interpolated value 2.

On the other hand, in Step S150, when it is determined that the pattern of the target position is not an edge, that is, the pattern of the target position is a flat pattern, the processing proceeds to Step S152. In Step S152, the interpolated-value selecting unit 106 selects the interpolated value 2 as the interpolated value among the interpolated value 1 and the interpolated value 2.

Upon selection of the interpolated value, that is, the interpolated value 1 or the interpolated value 2 by processing of Steps S151 and S152, the processing proceeds to Step S153.

In Step S153, as in Step S108 of FIG. 8, it is determined whether all of the pixels are selected as target positions by the processing of Step S141. When it is determined that all of the pixels are not selected as target positions, the processing returns back to Step S141 and the processing described above is repeated.

When all of the pixels are selected as target positions by the processing of Step S141 and the interpolated values of the target positions are selected by repetition of the processing of Steps S141 to S153, and when it is determined in Step S153 that all of the pixels are selected as target positions, the processing proceeds to Step S154.

In Step S154, an output image is generated according to the interpolated values of the respective target positions. When the output image is generated by the processing of Step S154, the pixel value interpolation processing of FIG. 15 is terminated.

Hereinabove, the pixel value interpolation processing executed by the image processing apparatus 10 of FIG. 13 has been described. In the pixel value interpolation processing of FIG. 15, the interpolated value 1 along the edge direction and the interpolated value 2 in which the direction of the pattern is not taken into consideration are selectively applied in accordance with the pattern of the target position. With this operation, as compared with the pixel value interpolation processing for providing a smoothing component in which the directionality of the pattern of the target position is not taken into consideration, an output of an edge area with sharpness and an output of a flat area involving a noise reduction effect by averaging can be obtained.

<Modified Example of Second Embodiment>

In the image processing apparatus 10 of FIG. 13, the two interpolated values are calculated by the first interpolated-value calculating unit 105-1 and the second interpolated-value calculating unit 105-2, and one of the two interpolated values is selected by the interpolated-value selecting unit 106 in a subsequent stage in accordance with the pattern classification result. However, a configuration in which the pattern classification processing by the pattern classifying unit 107 is first performed and then only one interpolated value corresponding to the pattern classification result is calculated can be adopted. Next, the case of adopting such a configuration will be described with reference to FIGS. 16 and 17.

(Configuration Example of Image Processing Apparatus)

Figure 16:
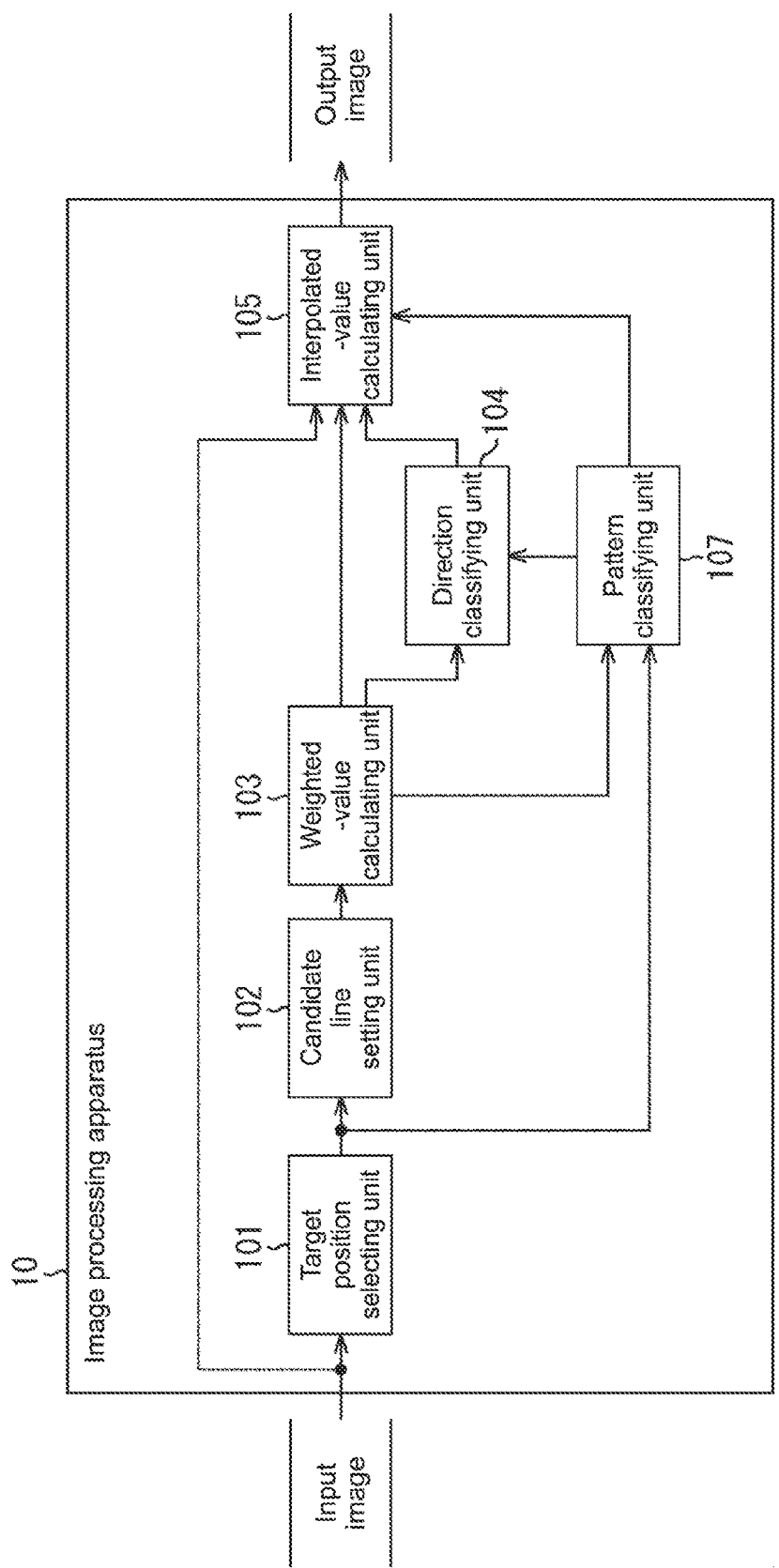
FIG. 16 is a diagram showing another configuration of the image processing apparatus in the second embodiment.

FIG. 16 is a diagram showing another configuration of the image processing apparatus in the second embodiment.

As shown in FIG. 16, an image processing apparatus 10 includes a target position selecting unit 101, a candidate line setting unit 102, a weighted-value calculating unit 103, a direction classifying unit 104, an interpolated-value calculating unit 105, and a pattern classifying unit 107.

In the image processing apparatus 10 of FIG. 16, the pattern classifying unit 107 is newly provided as compared with the image processing apparatus 10 of FIG. 1. In FIG. 16, the target position selecting unit 101, the candidate line setting unit 102, and the weighted-value calculating unit 103 perform the same processing as the target position selecting unit 101, the candidate line setting unit 102, and the weighted-value calculating unit 103 of FIG. 1.

Processing results are supplied from the target position selecting unit 101 and the weighted-value calculating unit 103 to the pattern classifying unit 107. Based on those processing results, the pattern classifying unit 107 performs processing of classifying the pattern of the target position by using weighted values of respective pixels on the candidate lines and supplies a processing result to the direction classifying unit 104 and the interpolated-value calculating unit 105.

Processing results are supplied from the weighted-value calculating unit 103 and the pattern classifying unit 107 to the direction classifying unit 104. In the case where the target position is in an edge area, the direction classifying unit 104 performs processing of selectively determining a set of candidate lines close to the direction of the pattern of the target position, based on the processing result supplied from the weighted-value calculating unit 103, and supplies a processing result to the interpolated-value calculating unit 105.

In addition to an input image, processing results are supplied from the weighted-value calculating unit 103, the direction classifying unit 104, and the pattern classifying unit 107 to the interpolated-value calculating unit 105. In the case where the target position is in an edge area, the interpolated-value calculating unit 105 performs processing of calculating a pixel value of the target position by using only the pixels on the candidate lines close to the direction of the pattern of the target position. Further, in the case where the target position is in a flat area, the interpolated-value calculating unit 105 performs smoothing processing by a lowpass filter, for example. An output image thus obtained is output to a subsequent stage.

(Pixel Value Interpolation Processing)

Figure 17:
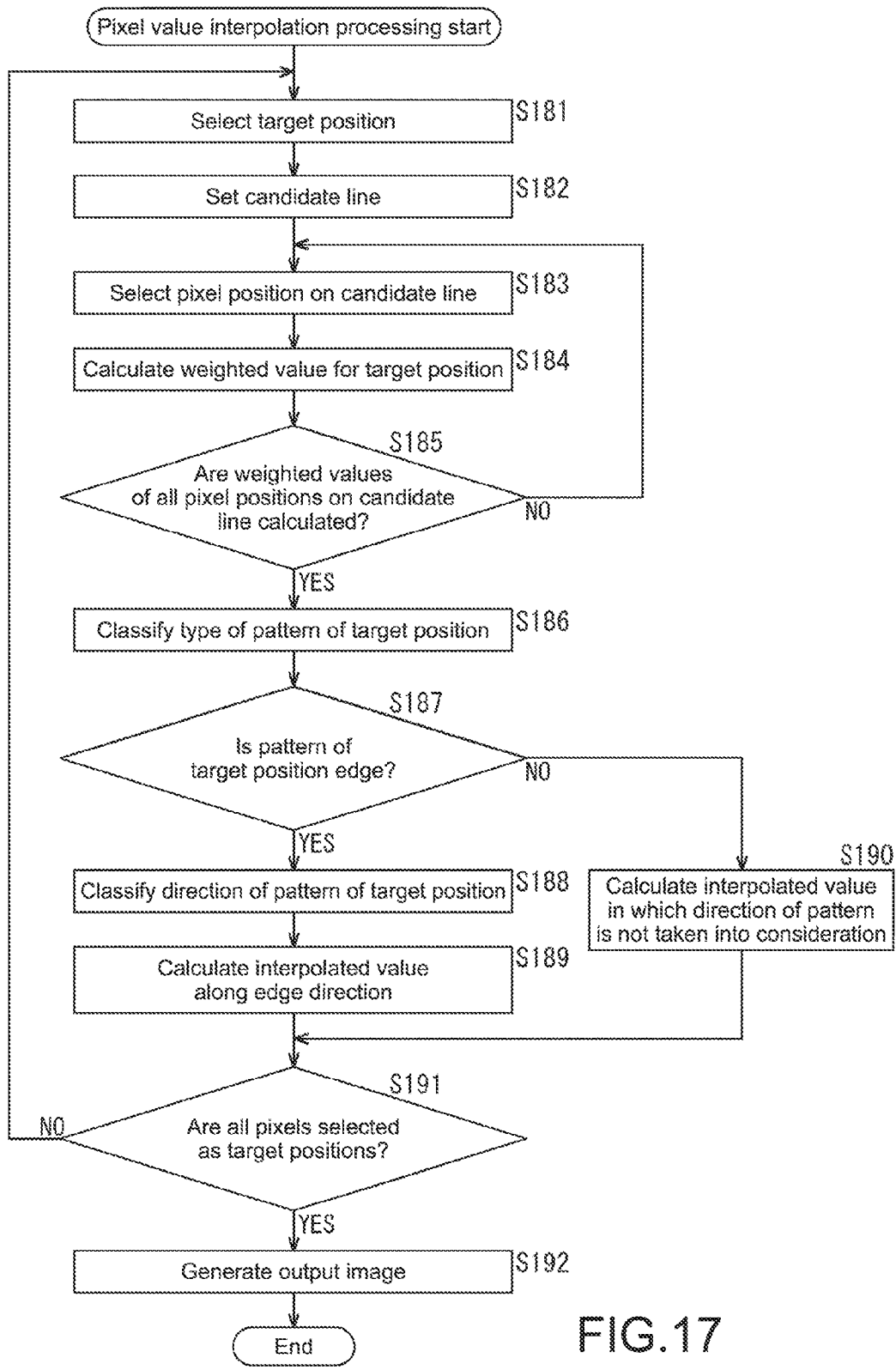
FIG. 17 is a flowchart for describing the flow of the pixel value interpolation processing in the second embodiment.

Next, the flow of the pixel value interpolation processing executed by the image processing apparatus 10 of FIG. 16 will be described with reference to the flowchart of FIG. 17.

In Steps S181 to S185, as in Steps S101 to S105 of FIG. 8, candidate lines for the target position are set and weighted values of all of pixel positions on the candidate lines are calculated.

In Step S186, the pattern classifying unit 107 classifies the type of pattern of the target position by using the weighted values of the respective pixels on the candidate lines.

In Step S187, the pattern classifying unit 107 determines whether the pattern of the target position is an edge or not. In Step S187, when it is determined that the pattern of the target position is an edge, the processing proceeds to Step S188.

In Step S188, based on the sum of weighted values calculated by repetition of the processing of Steps S183 and S184, the direction classifying unit 104 selectively determines a set of candidate lines close to the direction of the pattern of the target position.

In Step S189, the interpolated-value calculating unit 105 calculates an interpolated value along an edge direction by using only the pixels on the candidate lines close to the direction of the pattern of the target position.

On the other hand, in Step S187, when it is determined that the pattern of the target position is not an edge, the processing proceeds to Step S190. In Step S190, the interpolated-value calculating unit 105 performs smoothing processing by a lowpass filter and calculates an interpolated value in which a direction of the pattern is not taken into consideration.

Upon calculation of the interpolated value by processing of Steps S189 and S190, the processing proceeds to Step S191.

In Step S191, as in Step S108 of FIG. 8, it is determined whether all of the pixels are selected as target positions by the processing of Step S181. When it is determined that all of the pixels are not selected as target positions, the processing returns back to Step S181 and the processing described above is repeated.

When all of the pixels are selected as target positions by the processing of Step S181 and the interpolated values of the target positions are selected by repetition of the processing of Steps S181 to S191, and when it is determined in Step S191 that all of the pixels are selected as target positions, the processing proceeds to Step S192.

In Step S192, an output image is generated according to the interpolated values of the respective target positions. When the output image is generated by the processing of Step S192, the pixel value interpolation processing of FIG. 17 is terminated.

Hereinabove, the pixel value interpolation processing executed by the image processing apparatus 10 of FIG. 16 has been described. In the pixel value interpolation processing of FIG. 17, the interpolated value along the edge direction or the interpolated value in which the direction of the pattern is not taken into consideration is selectively applied in accordance with the pattern of the target position. With this operation, as compared with the pixel value interpolation processing for providing a smoothing component in which the directionality of the pattern of the target position is not taken into consideration, an output of an edge area with sharpness and an output of a flat area involving a noise reduction effect by averaging can be obtained.

<3. Third Embodiment>

In the first embodiment and the second embodiment described above, the case where the pixel value interpolation processing according to an embodiment of the present disclosure is used for enlargement processing of the input image has been described. However, the pixel value interpolation processing according to an embodiment of the present disclosure can be applied to other processing. Such application examples include demosaic processing in an imaging device. As shown in the leftmost part of FIG. 18, in an image sensor using a color filter array of bayer array, G (green) color filters are disposed in a checkered pattern and R (red) and B (blue) color filters are each disposed alternately in every two rows in the remaining area.

An input image to be input into the image processing apparatus 10 is, for example, an image formed of output values of an image sensor in which the color filter array of bayer array is used. In other words, the input image is an image corresponding to signals output from the image sensor.

Figure 18:
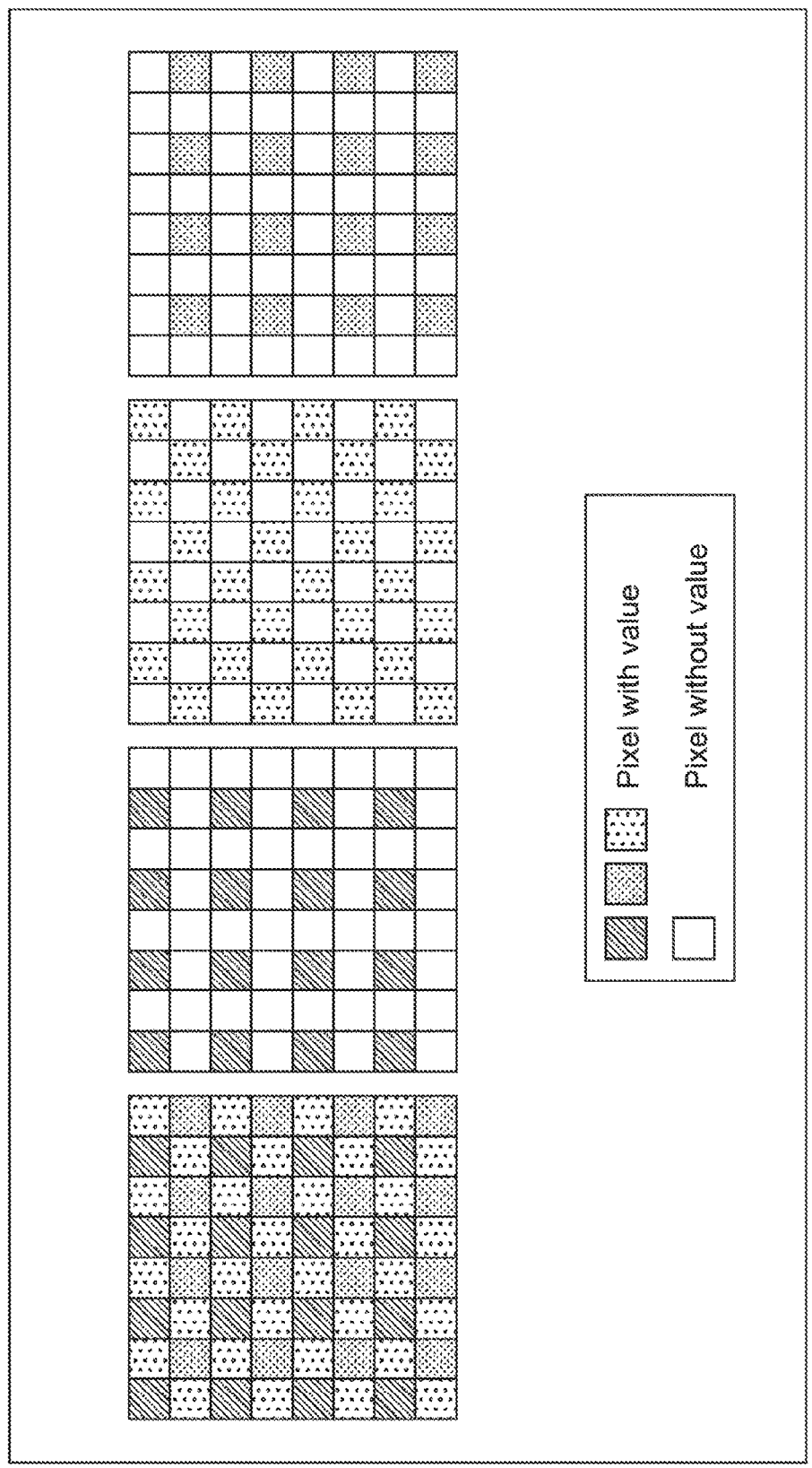
FIG. 18 is a diagram for describing demosaic processing in a third embodiment.

So, as shown in the left center part of FIG. 18, in the input image, from a pixel at which the R color filter is disposed, a pixel signal of an R component is obtained, but pixel signals of a G component and a B component are not obtained. Similarly, as shown in the right center part of FIG. 18, from a G pixel, only the pixel signal of the G component is obtained and the pixel signals of the R component and the B component are not obtained, and as shown in the rightmost part of FIG. 18, from a B pixel, only the pixel signal of the B component is obtained and the pixel signals of the R component and the G component are not obtained.

For that reason, in the image processing apparatus 10, the pixel value interpolation processing according to an embodiment of the present disclosure is applied to the pixel signals output from the image sensor, and pixel value interpolation is performed on free pixels for each of the colors. Thus, the pixel signal of R pixel, the pixel signal of G pixel, and the pixel signal of B pixel are obtained and generated as an output image.

Figures 19A, 19B:
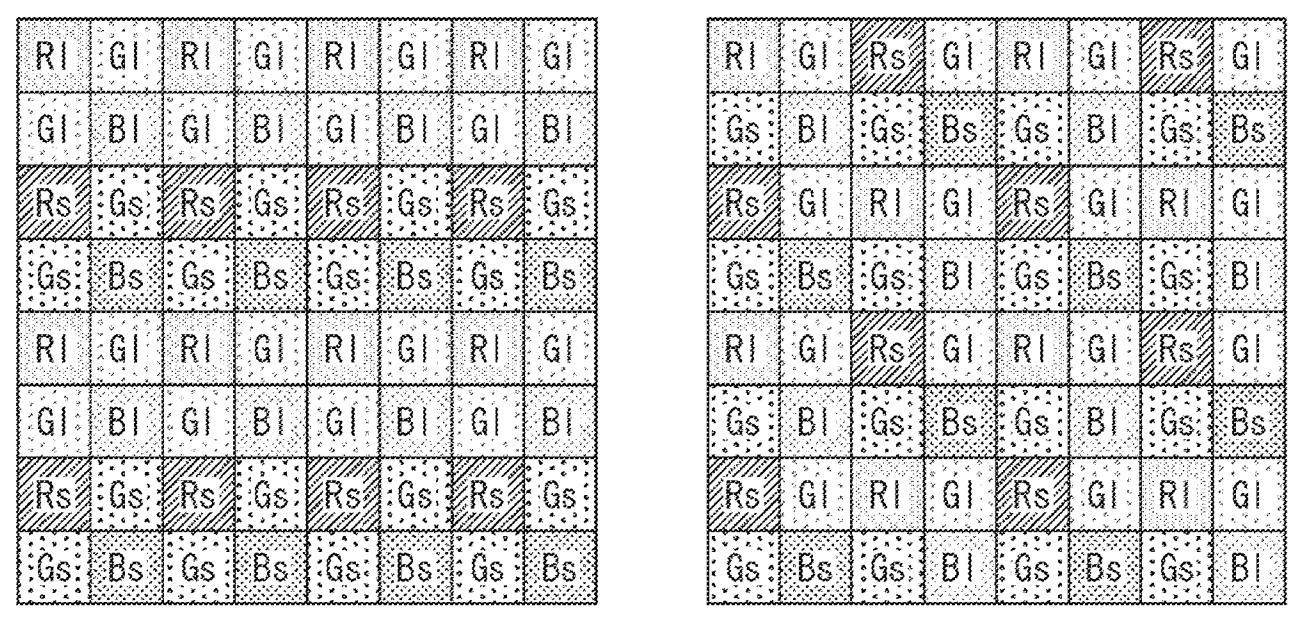

It should be noted that in FIG. 18, the example in which the color filter array of bayer array is used as the color filter array has been described, but as shown in FIGS. 19A and 19B, a color filter array other than the bayer array may be used. Two pixel arrays shown in FIGS. 19A and 19B are merely examples of a pixel array of an image sensor that is suitable for HDR (High Dynamic Range) imaging.

As shown in FIGS. 19A and 19B, a color filter array having three colors of R, G, and B is disposed, in which two exposure times, that is, a long exposure time and a short exposure time exist for each of the colors. In FIGS. 19A and 19B, the difference in exposure time is expressed by the tail end of characters imparted to each pixel. In the case where the tail end is "l", it represents a pixel for long exposure, and in the case where the tail end is "s", it represents a pixel for short exposure.

In the image processing apparatus 10, the pixel value interpolation processing according to an embodiment of the present disclosure is applied to the pixel signals output from the image sensor using this type of color filter array and the demosaic processing is performed according to the exposure time, that is, long exposure time and short exposure time, and thus two types of output images that are different in exposure time are generated. The output image by long exposure and the output image by short exposure are combined with each other, and thus an output image with a wide dynamic range can be obtained.

<Modified Example of Third Embodiment>

In the description described above, the case where the pixel value interpolation processing is applied to all pixels has been described, but the pixel value interpolation processing may be applied to only some pixels. For example, in the case of the bayer array shown in FIG. 18, the G components are disposed more than the R components and the B components. In such a case, the pixel value interpolation processing according to an embodiment of the present disclosure is applied to the pixels of G component that are disposed more densely than the other components. On the other hand, for the pixels of R component or B component that are sparser than the G components, for example, pixel value interpolation processing by a lowpass filter is performed thereon and then correlation processing of adding high-frequency waves of pixels of G component, which is the densest color, is performed thereon. Thus, interpolation of the pixel values for all colors can be performed.

<4. Fourth Embodiment>

Figure 20:
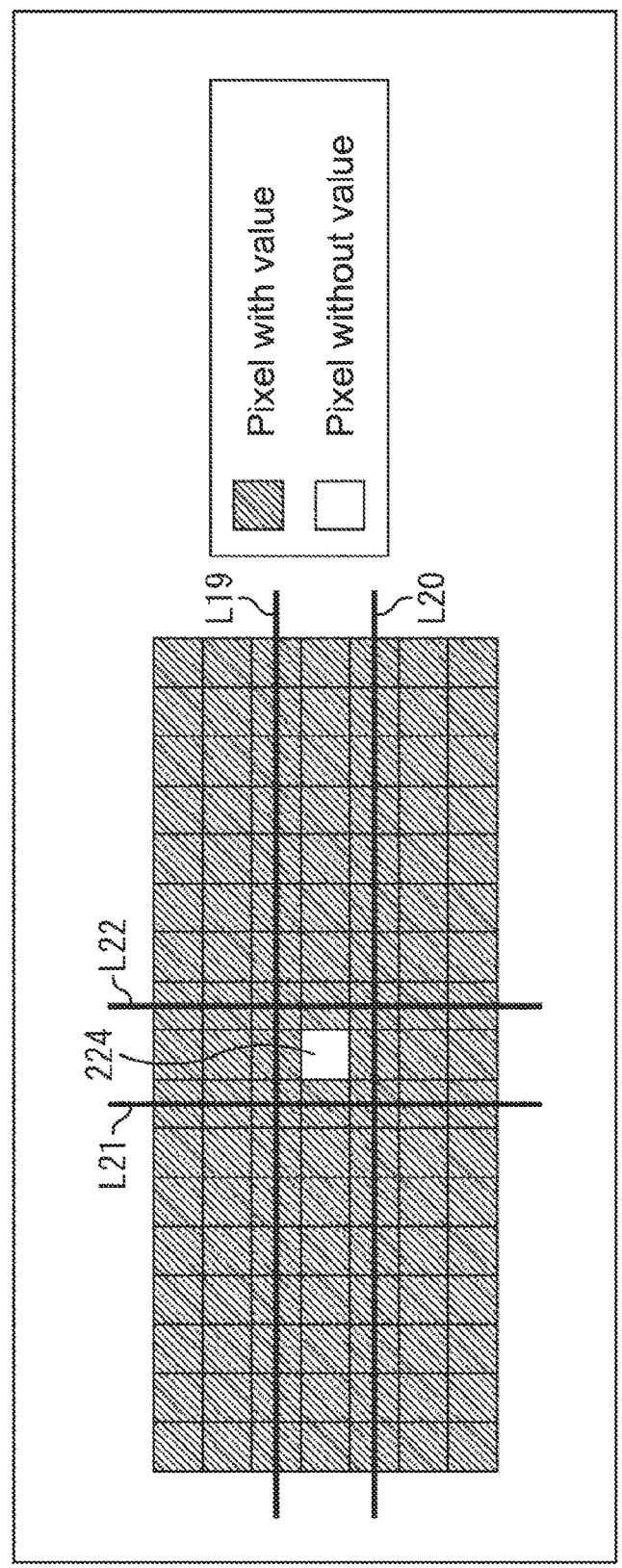
FIG. 20 is a diagram for describing pixel value interpolation processing of a defect pixel in a fourth embodiment.

Further, the pixel value interpolation processing according to an embodiment of the present disclosure can be used in, for example, pixel value interpolation of a detect pixel of the image sensor, in addition to the enlargement processing and demosaic processing of the input image described in the first to third embodiments. FIG. 20 shows an example in which a defect pixel 224 exists in a pixel plane. In the case of this example, the defect pixel 224 is assumed as a target position. Further, a set of candidate lines L19 and L20 in a horizontal direction and a set of candidate lines L21 and L22 in a vertical direction are set and the pixel value interpolation processing according to an embodiment of the present disclosure described above is applied thereto. Thus, interpolation of a pixel value of the defect pixel 224 can be performed.

<5. Fifth Embodiment>

FIGS. 21 to 25 are diagrams each showing a configuration example of a solid-state imaging device to which an embodiment of the present disclosure is applied.

Figure 21:
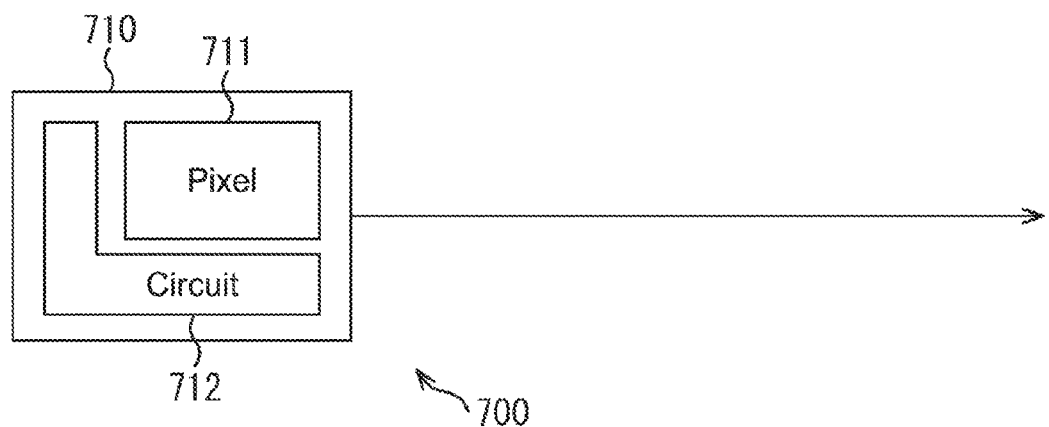
FIG. 21 is a diagram showing a configuration of a solid-state imaging device in the fifth embodiment.

In FIG. 21, a CMOS (Complementary Metal Oxide Semiconductor) image sensor 700 includes a pixel array unit and a peripheral circuit unit. In the pixel array unit, unit pixels 710 are two-dimensionally disposed in a matrix and each include a pixel area 711 and a circuit area 712 that are formed on the same substrate. Each of the unit pixels 710 disposed in the pixel array unit includes a photoelectric conversion element that generates charge having a charge amount corresponding to the amount of incident light and accommodates the charge therein.

The peripheral circuit unit has an AD (Analog Digital) conversion function of converting a pixel signal, which is transmitted from each unit pixel of a selected row for each pixel column of the pixel array unit through a vertical signal line, into a digital signal. Further, the peripheral circuit unit has a function of the image processing apparatus 10 of FIG. 1 or the like. For example, the demosaic processing in the third embodiment can be performed on a signal (input image) output from the pixel array unit.

Figure 22:
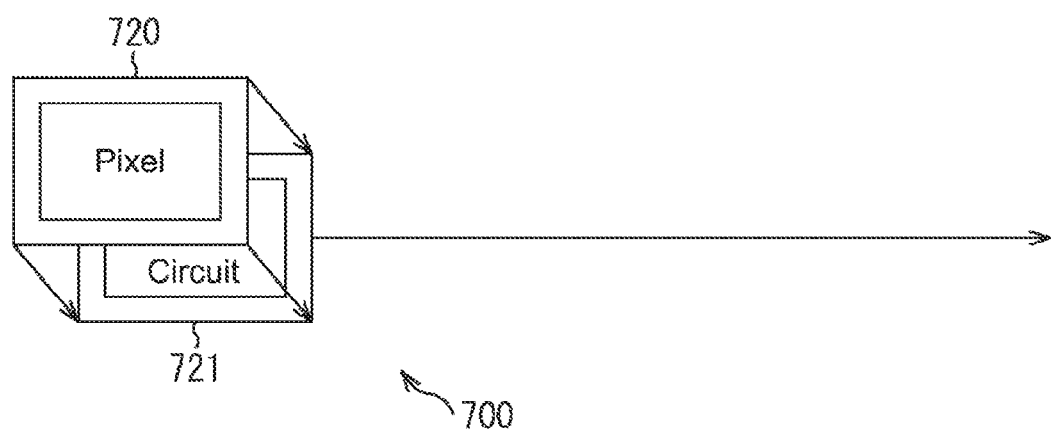
FIG. 22 is a diagram showing a configuration of a solid-state imaging device in the fifth embodiment.

It should be noted that as shown in FIG. 22, in the CMOS image sensor 700 having a laminated structure in which a pixel area 720 and a circuit area 721 are laminated, the peripheral circuit unit may have a function of the image processing apparatus 10 of FIG. 1 or the like.

Figure 23:
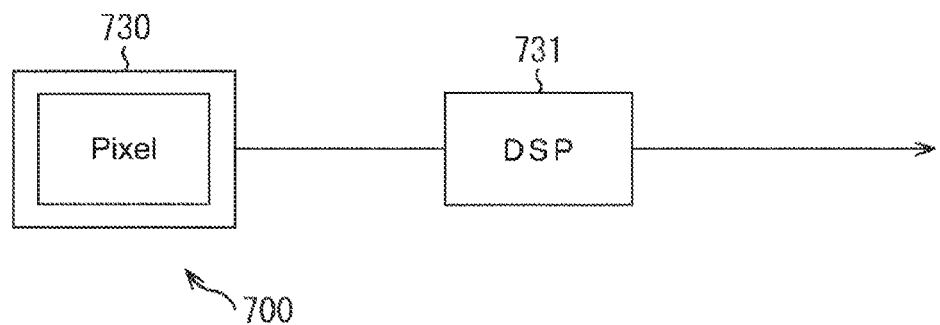
FIG. 23 is a diagram showing a configuration of a solid-state imaging device in the fifth embodiment.
Figure 24:
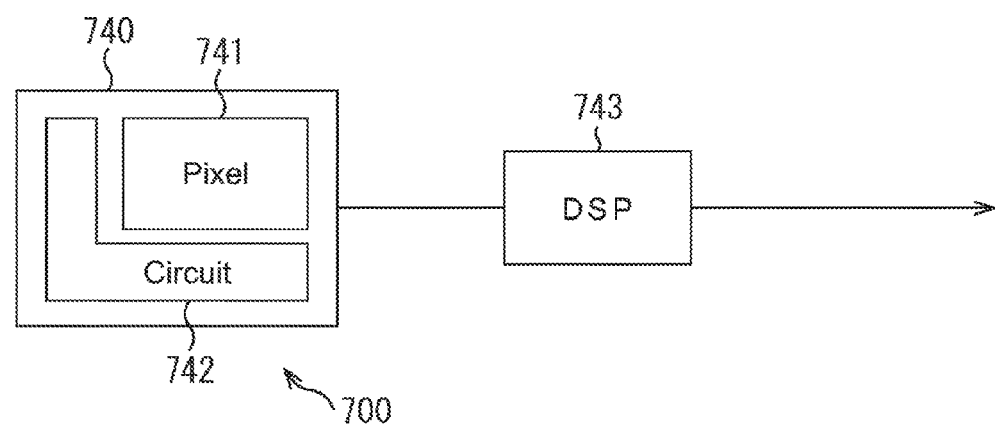
FIG. 24 is a diagram showing a configuration of a solid-state imaging device in the fifth embodiment.
Figure 25:
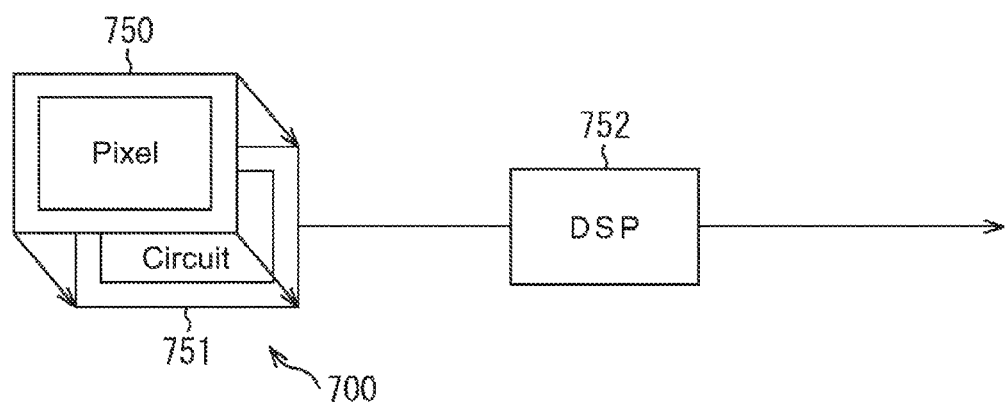
FIG. 25 is a diagram showing a configuration of a solid-state imaging device in the fifth embodiment.

Further, as shown in FIGS. 23 to 25, a DSP (Digital Signal Processor) circuit connected to the CMOS image sensor 700 may have a function of the image processing apparatus 10 of FIG. 1 or the like. Specifically, in the configuration of FIG. 23, various types of signal processing, the demosaic processing in the third embodiment, and the like are performed in the DSP circuit unit 731 connected to a subsequent stage of the CMOS image sensor 700. Further, in the configuration of FIG. 24, a DSP circuit unit 743 performs the demosaic processing in the third embodiment and the like on a signal output from the CMOS image sensor 700. Furthermore, in the configuration of FIG. 25, a DSP circuit unit 752 performs the demosaic processing in the third embodiment and the like on a signal output from the CMOS image sensor 700 having a laminated structure.

It should be noted that the CMOS image sensor 700 is merely an example of the solid-state imaging device, and other solid-state imaging devices such as a CCD (Charge Coupled Device) may be used.

<6. Sixth Embodiment>

Figure 26:
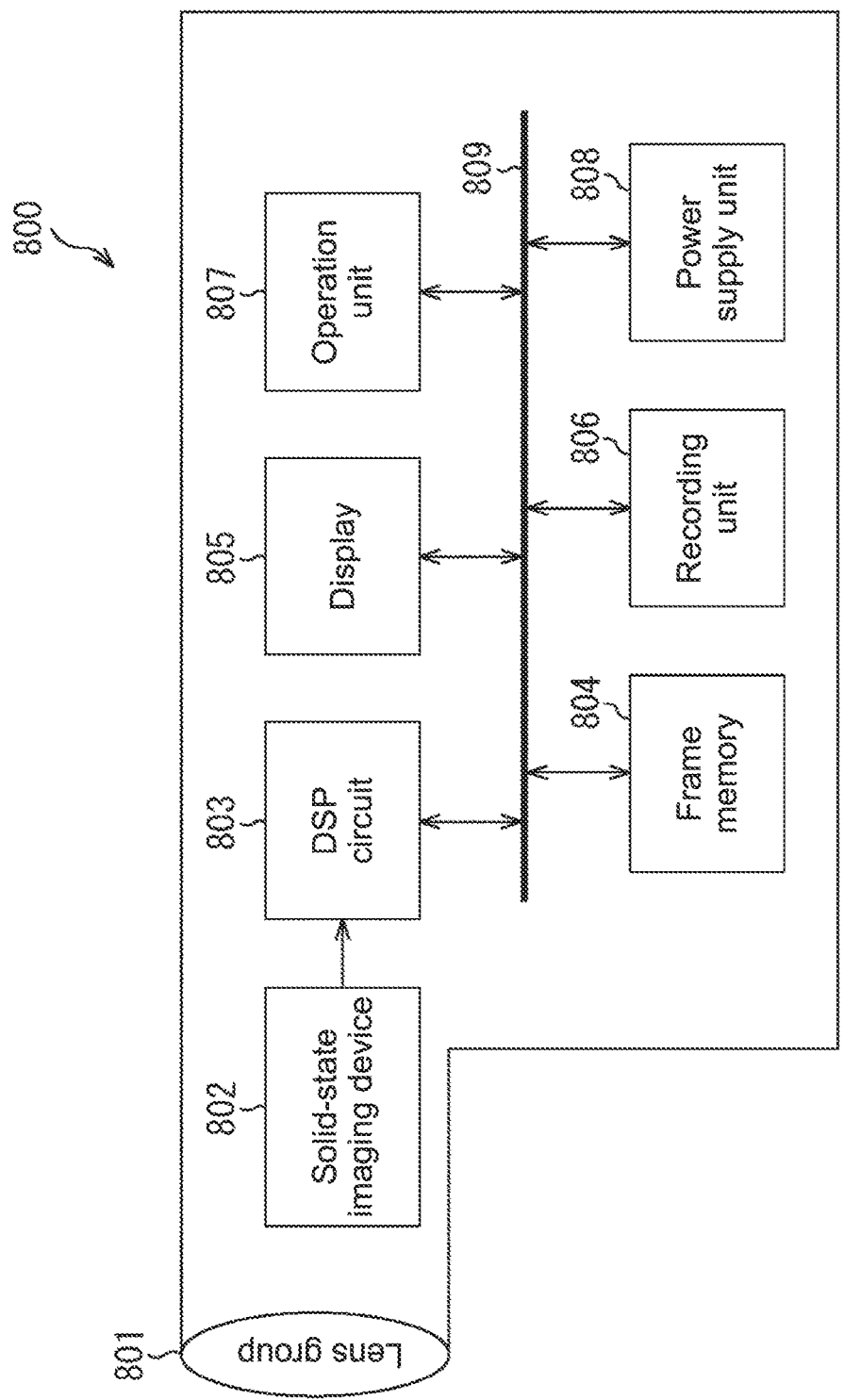
FIG. 26 is a diagram showing a configuration of an electronic apparatus in a sixth embodiment.

FIG. 26 is a diagram showing a configuration example of an electronic apparatus to which an embodiment of the present disclosure is applied.

As shown in FIG. 26, an electronic apparatus 800 includes an optical unit 801 including a lens group and the like, a solid-state imaging device 802, and a DSP circuit 803 serving as a camera signal processing circuit. Further, the electronic apparatus 800 also includes a frame memory 804, a display 805, a recording unit 806, an operation unit 807, and a power supply unit 808. The DSP circuit 803, the frame memory 804, the display 805, the recording unit 806, the operation unit 807, and the power supply unit 808 are connected to one another via a bus line 809.

The optical unit 801 takes in incident light coming from a subject, i.e., an image light, and forms an image on an imaging surface of the solid-state imaging device 802. The solid-state imaging device 802 converts the amount of incident light, with which the image is formed on the imaging surface by the optical unit 801, into an electrical signal on a pixel-by-pixel basis. The solid-state imaging device 802 outputs the electrical signal as a pixel signal. The solid-state imaging device such as the CMOS image sensor 700 in the fifth embodiment can be used as the solid-state imaging device 802. In this case, the DSP circuit 803 corresponds to the DSP circuit unit 731 (FIG. 23), the DSP circuit unit 743 (FIG. 24), the DSP circuit unit 752 (FIG. 25), or the like in the fifth embodiment.

The display 805 is formed of, for example, a panel display such as a liquid crystal panel or an organic EL (Electro Luminescence) panel and displays moving images or still images captured by the solid-state imaging device 802. The recording unit 806 records data of the moving images or still images captured by the solid-state imaging device 802 on a recording medium such as a semiconductor memory.

The operation unit 807 gives an instruction of an operation on various functions of the electronic apparatus 800 in accordance with the operation of a user. The power supply unit 808 appropriately supplies power, by which the DSP circuit 803, the frame memory 804, the display 805, the recording unit 806, the operation unit 807, and the like operate, to those supply targets.

<7. Seventh Embodiment>

A series of processing described above can be executed by hardware or software. In the case where the series of processing is executed by software, a program that configures the software is installed in a computer. Here, the computer includes a computer incorporated in dedicated hardware, a general-purpose personal computer that can execute various functions by installing various programs therein, and the like.

FIG. 27 is a block diagram showing a hardware configuration example of a computer that executes the series of processing described above by a program.

In a computer 900, a CPU (Central Processing Unit) 901, a ROM (Read Only Memory) 902, and a RAM (Random Access Memory) 903 are connected to one another by a bus 904. An input and output interface 910 is further connected to the bus 904. An input unit 911, an output unit 912, a recording unit 913, a communication unit 914, and a drive 915 are connected to the input and output interface 910.

The input unit 911 includes a keyboard, a mouse, a microphone, and the like. The output unit 912 includes a display, a speaker, and the like. The recording unit 913 includes a hard disk, a non-volatile memory, and the like. The communication unit 914 includes a network interface and the like. The drive 915 drives a removable medium 921 such as a magnetic disc, an optical disc, a magneto-optical disc, or a semiconductor memory.

In the computer 900 configured as described above, the series of processing described above is performed, for example, when the CPU 901 loads a program stored in the recording unit 913 to the RAM 903 via the input and output interface 910 and the bus 904 for execution.

The program executed by the computer 900 (CPU 901) can be provided by being recorded on the removable medium 921 as a package medium or the like. Further, the program can be provided via a wired or wireless transmission medium such as a local area network, the Internet, and a digital satellite broadcast. In the computer 900, the program can be installed in the recording unit 913 via the input and output interface 910 by mounting the removable medium 921 into the drive 915. Further, the program can be installed in the recording unit 913 by being received by the communication unit 914 via a wired or wireless transmission medium. Additionally, the program can be previously installed in the ROM 902 or the recording unit 913.

It should be noted that the program executed by the computer 900 may be a program that is processed chronologically along the order described in this specification or may be a program that is processed in parallel or at a necessary timing such as when an invocation is performed.

Here, in this specification, processing steps describing a program for causing the computer 900 to perform various types of processing are not necessarily performed chronologically along the order described as a flowchart, and also include processing executed in parallel or individually (for example, parallel processing or processing by object). Further, the program may be processed by one computer or may be distributed for processing by a plurality of computers. Furthermore, the program may be executed by being transferred to a remote computer.

Moreover, in this specification, a system means an aggregation of a plurality of constituent elements (apparatus, module (part), and the like), regardless of whether all constituent elements are included in the same casing. So, a plurality of apparatuses accommodated in separate casings and connected to one another via a network corresponds to a system, and one apparatus including a plurality of modules in one casing also corresponds to a system.

It should be noted that the embodiments of the present disclosure are not limited to the embodiments described above and can be variously modified without departing from the gist of the present disclosure. For example, the present disclosure can have a configuration of cloud computing in which a plurality of apparatuses share one function and cooperate to perform processing via a network.

Further, the steps described in the flowchart described above can be executed by one apparatus or shared and executed by a plurality of apparatuses. In addition, in the case where one step includes a plurality of processing steps, the plurality of processing steps in one step can be executed by one apparatus or shared and executed by a plurality of apparatuses.

It should be noted that the present disclosure can have the following configurations.

(1) An image processing apparatus, including:

a target position selecting unit configured to select a pixel position on an input image, as a target position in which a pixel value is interpolated;

a candidate line setting unit configured to set two or more sets of candidate lines including a pixel with a value, in the vicinity of the target position;

a weighted-value calculating unit configured to calculate a weighted value that corresponds to a degree of expectation that the target position and the pixel position on the candidate line are on the same pattern;

a direction classifying unit configured to selectively determine a set of candidate lines that are close to a direction of a pattern of the target position in accordance with the weighted value of each pixel on the candidate lines; and a first interpolated-value calculating unit configured to calculate a pixel value of the target position in accordance with the weighted value of each pixel on the candidate lines.

(2) The image processing apparatus according to (1), in which the first interpolated-value calculating unit is configured to set an interpolated value smoothed in an extending direction of the candidate lines, as a provisional pixel value for interpolation, in a pixel without a value on the candidate lines, and then calculate the pixel value of the target position.

(3) The image processing apparatus according to (2), in which
the first interpolated-value calculating unit is configured to calculate the pixel value of the target position by using only a pixel on the candidate lines that are close to the direction of the pattern of the target position.

(4) The image processing apparatus according to (2), in which
the first interpolated-value calculating unit is configured to calculate an interpolated value for each of the sets of candidate lines,
the image processing apparatus further including an interpolated-value selecting unit configured to select an interpolated value calculated from pixels on the candidate lines that are close to the direction of the pattern of the target position, from interpolated values calculated for the respective sets of candidate lines.

(5) The image processing apparatus according to (1), further including:
a second interpolated-value calculating unit configured to calculate an interpolated value in which the direction of the pattern of the target position is not taken into consideration;
a pattern classifying unit configured to classify the pattern of the target position in accordance with the weighted value of each pixel on the candidate lines; and
an interpolated-value selecting unit configured to select one of the interpolated value calculated by the first interpolated-value calculating unit and the interpolated value calculated by the second interpolated-value calculating unit, in accordance with a result of the classification of the pattern of the target position.

(6) The image processing apparatus according to (1), further including a pattern classifying unit configured to classify the pattern of the target position in accordance with the weighted value of each pixel on the candidate lines, in which
the first interpolated-value calculating unit is configured to calculate an interpolated value in accordance with a result of the classification of the pattern of the target position.

(7) The image processing apparatus according to any one of (1) to (6), in which
the candidate line setting unit is configured to set the candidate lines to be parallel to each other in each set and to be symmetric to each other with respect to the target position in each set.

(8) The image processing apparatus according to any one of (1) to (7), in which
the candidate line setting unit is configured to set the sets of candidate lines to be orthogonal to each other.

(9) The image processing apparatus according to (8), in which
the candidate line setting unit is configured to set the candidate lines to pass through the target position.

(10) The image processing apparatus according to any one of (1) to (9), in which
the direction of the pattern of the target position includes one of a horizontal direction and a vertical direction on the input image.

(11) The image processing apparatus according to any one of (1) to (10), in which
the input image includes an image enlarged in at least one of a horizontal direction and a vertical direction.

(12) The image processing apparatus according to any one of (1) to (10), in which
the input image includes an image obtained from an output value of a solid-state imaging device using a color filter array including a predetermined array.

(13) The image processing apparatus according to any one of (1) to (10), in which
the input image includes an image including a defect pixel of a solid-state imaging device.

(14) An image processing method for an image processing apparatus, the method including:
selecting a pixel position on an input image, as a target position in which a pixel value is interpolated;
setting two or more sets of candidate lines including a pixel with a value, in the vicinity of the target position;
calculating a weighted value that corresponds to a degree of expectation that the target position and the pixel position on the candidate line are on the same pattern;
selectively determining a set of candidate lines that are close to a direction of a pattern of the target position in accordance with the weighted value of each pixel on the candidate lines; and
calculating a pixel value of the target position in accordance with the weighted value of each pixel on the candidate lines.

(15) A solid-state imaging device, including:
a pixel array unit configured to regularly dispose pixels in a matrix, the pixels corresponding to a plurality of respective color components; and
a signal processing unit configured to perform predetermined signal processing on a pixel signal from the pixel array unit, the signal processing unit including
a target position selecting unit configured to select a pixel position on an input image, as a target position in which a pixel value is interpolated, the input image being obtained from the pixel signal from the pixel array unit,
a candidate line setting unit configured to set two or more sets of candidate lines including a pixel with a value, in the vicinity of the target position,
a weighted-value calculating unit configured to calculate a weighted value that corresponds to a degree of expectation that the target position and the pixel position on the candidate line are on the same pattern,
a direction classifying unit configured to selectively determine a set of candidate lines that are close to a direction of a pattern of the target position in accordance with the weighted value of each pixel on
the candidate lines, and an interpolated-value calculating unit configured to calculate a pixel value of the target position in accordance with the weighted value of each pixel on the candidate lines.

(16) An electronic apparatus, including:
a solid-state imaging device; and
an image processing unit,
the solid-state imaging device including
a pixel array unit configured to regularly dispose pixels in a matrix, the pixels corresponding to a plurality of respective color components, and
a signal processing unit configured to perform predetermined signal processing on a pixel signal from the pixel array unit,
the image processing unit including
a target position selecting unit configured to select a pixel position on an input image, as a target position in which a pixel value is interpolated, the input image being obtained from the pixel signal from the solid-state imaging device,
a candidate line setting unit configured to set two or more sets of candidate lines including a pixel with a value, in the vicinity of the target position,
a weighted-value calculating unit configured to calculate a weighted value that corresponds to a degree of expectation that the target position and the pixel position on the candidate line are on the same pattern, a direction classifying unit configured to selectively determine a set of candidate lines that are close to a direction of a pattern of the target position in accordance with the weighted value of each pixel on the candidate lines, and an interpolated-value calculating unit configured to calculate a pixel value of the target position in accordance with the weighted value of each pixel on the candidate lines.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising memory and one or more processors, the one or more processors configured to:
   select a pixel position on an input image, as a target position which a pixel value is interpolated;
   set two or more sets of candidate lines including a pixel with a value, in a vicinity of the target position;
   calculate a weighted value for each pixel position on the candidate lines that corresponds to a degree of expectation that the target position and the pixel position on a respective candidate line of the candidate lines is on a same pattern;
   determine a set of candidate lines that are close to a direction of a pattern of the target position in accordance with the weighted value of each pixel on the candidate lines; and
   calculate a pixel value of the target position in accordance with the weighted value of each pixel on the candidate lines.

2. The image processing apparatus according to claim 1, wherein the one or more processors is configured to set an interpolated value smoothed in an extending direction of the candidate lines, as a provisional pixel value for interpolation, in a pixel without a value on the candidate lines, and then calculate the pixel value of the target position.

3. The image processing apparatus according to claim 2, wherein the one ore more processors is configured to calculate the pixel value of the target position by using only a pixel on the candidate lines that are close to the direction of the pattern of the target position.

4. The image processing apparatus according to claim 2, wherein the one or more processors is configured to calculate an interpolated value for each of the sets of candidate lines, and select an interpolated value from pixels on the candidate lines that are close to the direction of the pattern of the target position, from interpolated values calculated for respective sets of candidate lines.

5. The image processing apparatus according to claim 1, wherein the one or more processors is configured to:
   calculate an interpolated value in which the direction of the pattern of the target position is not taken into consideration;
   classify the pattern of the target position in accordance with the weighted value of each pixel on the candidate lines; and
   select one of the calculated and interpolated values in accordance with a result of the classification of the pattern of the target position.

6. The image processing apparatus according to claim 1, wherein the one or more processors is configured to classify the pattern of the target position in accordance with the weighted value of each pixel on the candidate lines, wherein an interpolated value is calculated in accordance with a result of the classification of the pattern of the target position.

7. The image processing apparatus according to claim 1, wherein the one or more processors is configured to set the candidate lines to be parallel to each other in each set and to be symmetric to each other with respect to the target position in each set.

8. The image processing apparatus according to claim 7, wherein the one or more processors is configured to set the sets of candidate lines to be orthogonal to each other.

9. The image processing apparatus according to claim 8, wherein the one or more processor is configured to set the candidate lines to pass through the target position.

10. The image processing apparatus according to claim 1, wherein the direction of the pattern of the target position includes one of a horizontal direction and a vertical direction on the input image.

11. The image processing apparatus according to claim 1, wherein the input image includes an image enlarged in at least one of a horizontal direction and a vertical direction.

12. The image processing apparatus according to claim 1, wherein the input image includes an image obtained from an output value of an imaging device using a color filter array including a predetermined array.

13. The image processing apparatus according to claim 1, wherein the input image includes an image including a defect pixel of an imaging device.

14. An image processing method for an image processing apparatus, the method comprising:
   selecting a pixel position on an input image, as a target position in which a pixel value is interpolated;
   setting two or more sets of candidate lines including a pixel with a value, in a vicinity of the target position;
   calculating a weighted value for each pixel position on the candidate lines that corresponds to a degree of expectation that the target position and the pixel position on a respective candidate line of the candidate lines is on a same pattern;
   selectively determining a set of candidate lines that are close to a direction of a pattern of the target position in accordance with the weighted value of each pixel on the candidate lines; and
   calculating a pixel value of the target position in accordance with the weighted value of each pixel on the candidate lines.

15. An imaging device, comprising:
   a pixel array including regularly disposed pixels in a matrix, the pixels corresponding to a plurality of respective color components; and
   one or more processors configured to perform predetermined signal processing on a pixel signal from the pixel array, the one or more processors configured to:
      select a pixel position on an input image, as a target position in which a pixel value is interpolated, the input image being obtained from the pixel signal from the pixel array unit,
      set two or more sets of candidate lines, including a pixel with a value, in a vicinity of the target position,
      calculate a weighted value for each pixel position on the candidate lines that corresponds to a degree of expectation that the target position and the pixel position on a respective candidate line of the candidate lines is on a same pattern, determine a set of candidate lines that are close to a direction of a pattern of the target position in accordance with the weighted value of each pixel on the candidate lines, and calculate a pixel value of the target position in accordance with the weighted value of each pixel on the candidate lines.

16. An electronic apparatus, comprising:

an imaging device; and an image processing unit, the imaging device including:

a pixel array including regularly disposed pixels in a matrix, the pixels corresponding to a plurality of respective color components, and one or more processors configured to perform predetermined signal processing on a pixel signal from the pixel array unit, the one or more processors configured to:

select a pixel position on an input image, as a target position in which a pixel value is interpolated, the input image being obtained from the pixel signal from the imaging device, set two or more sets of candidate lines, including a pixel with a value, in a vicinity of the target position, calculate a weighted value for each pixel position on the candidate lines that corresponds to a degree of expectation that the target position and the pixel position on a respective candidate line of the candidate lines is on a same pattern, determine a set of candidate lines that are close to a direction of a pattern of the target position in accordance with the weighted value of each pixel on the candidate lines, and calculate a pixel value of the target position in accordance with the weighted value of each pixel on the candidate lines.

* * * * *